US007555743B2

(12) United States Patent
Sridhar et al.

(10) Patent No.: US 7,555,743 B2
(45) Date of Patent: Jun. 30, 2009

(54) SNMP AGENT CODE GENERATION AND SNMP AGENT FRAMEWORK FOR NETWORK MANAGEMENT APPLICATION DEVELOPMENT

(75) Inventors: Manjula Sridhar, Lisle, IL (US); Edward G Brunell, Chicago, IL (US); Martin S. Halkyard, Denville, NJ (US); Shankar Krishnamoorthy, Scotch Plains, NJ (US); Manas Panda, Pompton Plains, NJ (US); Dong Zhao, Lisle, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 498 days.

(21) Appl. No.: 10/868,419

(22) Filed: Jun. 15, 2004

(65) Prior Publication Data
US 2005/0278692 A1   Dec. 15, 2005

(51) Int. Cl.
*G06F 9/44* (2006.01)
(52) U.S. Cl. .............. 717/106; 717/108; 717/141; 717/143; 717/144
(58) Field of Classification Search ............ 717/106, 717/108, 141, 143, 144
See application file for complete search history.

(56) References Cited

U.S. PATENT DOCUMENTS

| 4,484,264 | A |   | 11/1984 | Friedli et al. |
|---|---|---|---|---|
| 4,879,758 | A |   | 11/1989 | DeLuca et al. |
| 5,130,983 | A |   | 7/1992 | Heffner, III |
| 5,175,818 | A |   | 12/1992 | Kunimoto et al. |
| 5,257,371 | A | * | 10/1993 | Anezaki ................. 707/103 R |
| 5,293,619 | A |   | 3/1994 | Dean |
| 5,295,256 | A |   | 3/1994 | Bapat |
| 5,517,662 | A |   | 5/1996 | Coleman et al. |
| 5,519,868 | A |   | 5/1996 | Allen et al. |
| 5,557,744 | A |   | 9/1996 | Kobayakawa et al. |
| 5,632,035 | A |   | 5/1997 | Goodwin |
| 5,726,979 | A |   | 3/1998 | Henderson et al. |
| 5,737,518 | A | * | 4/1998 | Grover et al. ............... 714/38 |
| 5,742,762 | A |   | 4/1998 | Scholl et al. |
| 5,745,897 | A | * | 4/1998 | Perkins et al. ............. 707/101 |
| 5,751,962 | A | * | 5/1998 | Fanshier et al. ........... 709/223 |
| 5,768,529 | A |   | 6/1998 | Nikel et al. |

(Continued)

OTHER PUBLICATIONS

Cherkaoui, O. Saint Hillair, Y. Mili, H. Obaid, A.. "The modularity of SNMPv3." Proceedings of the Third IEEE Symposium on Computers & Communications (1998): 1-5.*

(Continued)

*Primary Examiner*—Wei Y Zhen
*Assistant Examiner*—Matthew J Brophy

(57) ABSTRACT

Methods of developing an application program to manage a distributed system or network are provided. In one embodiment, the method includes: a) defining managed objects in a resource definition language and storing the definition in resource definition language files, b) parsing the resource definition language files to ensure conformity with the resource definition language and creating an intermediate representation of the distributed system, c) processing the intermediate representation to form programming language classes, database definition files, and script files, d) developing a reusable asset center framework to facilitate development of the application program, the reusable asset center including an SNMP agent framework that provides SNMP interface functionality to the application program, and e) building the application program from the programming language classes, database definition files, script files, and the reusable asset framework.

41 Claims, 12 Drawing Sheets

U.S. PATENT DOCUMENTS

| | | | |
|---|---|---|---|
| 5,809,235 A * | 9/1998 | Sharma et al. | 709/230 |
| 5,892,950 A | 4/1999 | Rigori et al. | |
| 5,909,681 A | 6/1999 | Passera et al. | |
| 6,003,077 A * | 12/1999 | Bawden et al. | 709/223 |
| 6,018,625 A * | 1/2000 | Hayball et al. | 703/22 |
| 6,052,382 A | 4/2000 | Burke et al. | |
| 6,052,526 A | 4/2000 | Chatt | |
| 6,110,226 A * | 8/2000 | Bothner | 717/153 |
| 6,138,272 A | 10/2000 | Tonouchi | |
| 6,141,701 A | 10/2000 | Whitney | |
| 6,182,153 B1 * | 1/2001 | Hollberg et al. | 719/315 |
| 6,201,862 B1 | 3/2001 | Mercouroff et al. | |
| 6,219,703 B1 | 4/2001 | Nguyen et al. | |
| 6,226,788 B1 * | 5/2001 | Schoening et al. | 717/107 |
| 6,249,821 B1 | 6/2001 | Agatone et al. | |
| 6,269,396 B1 | 7/2001 | Shah et al. | |
| 6,298,476 B1 | 10/2001 | Misheski et al. | |
| 6,324,576 B1 | 11/2001 | Newcombe et al. | |
| 6,330,601 B1 | 12/2001 | French et al. | |
| 6,345,302 B1 | 2/2002 | Bennett et al. | |
| 6,360,258 B1 * | 3/2002 | LeBlanc | 709/223 |
| 6,360,262 B1 | 3/2002 | Guenthner et al. | |
| 6,363,421 B2 | 3/2002 | Barker et al. | |
| 6,366,583 B2 | 4/2002 | Rowett et al. | |
| 6,381,599 B1 | 4/2002 | Jones et al. | |
| 6,405,364 B1 | 6/2002 | Bowman-Amuah | |
| 6,427,171 B1 | 7/2002 | Craft et al. | |
| 6,427,173 B1 | 7/2002 | Boucher et al. | |
| 6,430,602 B1 | 8/2002 | Kay et al. | |
| 6,434,620 B1 | 8/2002 | Boucher et al. | |
| 6,467,085 B2 | 10/2002 | Larsson | |
| 6,490,631 B1 | 12/2002 | Teich et al. | |
| 6,519,635 B1 * | 2/2003 | Champlin et al. | 709/223 |
| 6,549,943 B1 * | 4/2003 | Spring | 709/223 |
| 6,550,024 B1 | 4/2003 | Pagurek et al. | |
| 6,553,404 B2 | 4/2003 | Stern | |
| 6,601,233 B1 * | 7/2003 | Underwood | 717/102 |
| 6,618,852 B1 | 9/2003 | van Elkeren et al. | |
| 6,681,386 B1 | 1/2004 | Amin et al. | |
| 6,751,676 B2 | 6/2004 | Fukuhara | |
| 6,754,703 B1 * | 6/2004 | Spring | 709/223 |
| 6,757,725 B1 | 6/2004 | Frantz et al. | |
| 6,813,770 B1 | 11/2004 | Allavarpu et al. | |
| 6,857,020 B1 | 2/2005 | Chaar et al. | |
| 6,891,802 B1 | 5/2005 | Hubbard | |
| 6,928,471 B2 | 8/2005 | Pabari et al. | |
| 6,981,266 B1 | 12/2005 | An et al. | |
| 6,990,636 B2 | 1/2006 | Beauchamp et al. | |
| 7,047,518 B2 | 5/2006 | Little et al. | |
| 7,076,766 B2 | 7/2006 | Wirts et al. | |
| 7,085,851 B2 * | 8/2006 | Nusbickel et al. | 709/246 |
| 7,117,504 B2 | 10/2006 | Smith et al. | |
| 7,127,721 B2 * | 10/2006 | Chaudhuri et al. | 719/316 |
| 7,174,533 B2 | 2/2007 | Boucher | |
| 7,249,359 B1 | 7/2007 | McCloghrie et al. | |
| 7,275,236 B1 | 9/2007 | Kabe | |
| 7,293,257 B2 | 11/2007 | Czerwonka | |
| 2001/0037389 A1 | 11/2001 | Fujimori et al. | |
| 2001/0044822 A1 * | 11/2001 | Nishio | 709/202 |
| 2002/0035626 A1 * | 3/2002 | Higuchi | 709/223 |
| 2002/0103890 A1 * | 8/2002 | Chaudhuri et al. | 709/223 |
| 2002/0111213 A1 | 8/2002 | McEntee et al. | |
| 2003/0177477 A1 * | 9/2003 | Fuchs | 717/136 |
| 2004/0088304 A1 | 5/2004 | Wang et al. | |
| 2005/0278709 A1 | 12/2005 | Sridhar et al. | |
| 2007/0100967 A1 | 5/2007 | Smith et al. | |

OTHER PUBLICATIONS

Cherkaoui, O. , Rico. N, Serhrouchni, A.. "SNMPv3 can still be simple?." Integrated Network Management, 1999, Distributed Management for the Networked Millennium, Proceedings of the Sixth IFIP/IEEE international Symposium (1999): 501-515.*

ITU-T Recommendation M.3010, Principles for a telecommunications management network, International Telecommunication Union, Telecommunication Standardization Sector, Feb. 2000.

ITU-T Recommendation M.3010 (2000) Prepublished Recommendation, Principles for a telecommunications management network—Amendment 1, International Telecommunication Union, Telecommunication Standardization Sector, Dec. 2003.

ITU-T Recommendation M.3100, Generic Network Information Model, International Telecommunication Union, Telecommunication Standardization Sector, Jul. 1995.

CCITT Recommendation X.721, Information Technology—Open Systems Interconnection—Structure of Management Information: Definition of Management Information, International Telecommunication Union, The International Telegraph and Telephone Consultative Committee, 1992.

CCITT Recommendation X.722, Information Technology—Open Systems Interconnection—Structure of Management Information: Guidelines for the Definition of Managed Objects, International Telecommunication Union, The International Telegraph and Telephone Consultative Committee, 1992.

RFC 2578, STD 58, Structure of Management Information Version 2 (SMIv2), The Internet Society, Network Working Group, Apr. 1999.

RFC 2579 STD 58, Textual Conventions for SMIv2, The Internet Society, Network Working Group, Apr. 1999.

RFC 2580 STD 58, Conformance Statements for SMIv2, The Internet Society, Network Working Group, Apr. 1999.

RFC 3410, Introduction and Applicability Statements for Internet Standard Management Framework, The Internet Society, Network Working Group, Dec. 2002.

RFC 3411, STD 62, An Architecture for Describing Simple Network Management Protocol (SNMP) Management Frameworks, The Internet Society, Network Working Group, Dec. 2002.

RFC 3412, STD 62, Message Processing and Dispatching for the Simple Network Management Protocol (SNMP), The Internet Society, Network Working Group, Dec. 2002.

RFC 3413, STD 62, Simple Network Management Protocol (SNMP) Applications, The Internet Society, Network Working Group, Dec. 2002.

RFC 3414, STD 62, User-based Security Model (USM) for version 3 of the Simple Network Management Protocol (SNMPv3), The Internet Society, Network Working Group, Dec. 2002.

RFC 3415, STD 62, View-based Access Control Model (VACM) for the Simple Network Management Protocol (SNMP), The Internet Society, Network Working Group, Dec. 2002.

RFC 3416, STD 62, Version 2 of the Protocol Operations for the Simple Network Management Protocol (SNMP), The Internet Society, Network Working Group, Dec. 2002.

RFC 3417, STD 62, Transport Mappings for the Simple Network Management Protocol (SNMP), The Internet Society, Network Working Group, Dec. 2002.

RFC 3418, STD 62, Management Information Base (MIB) for the Simple Network Management Protocol (SNMP), The Internet Society, Network Working Group, Dec. 2002.

RFC 3584, BCP 74, Coexistence between Version 1, Version 2, and Version 3 of the Internet-standard Network Management Framework, The Internet Society, Network Working Group, Aug. 2003.

Networking Solutions, Epilogue Envoy/Emissary Products, Integrated Systems, Inc., 1999.

Shim et al., "A Development Environment for Telecommunications Management Network", Eighteenth Annual International Computer Sofware and Applications Conference, pp. 175-180, 1994.

Sun Microsystems, "Solstice Enterprise Manager Reference Manual Release 2.0", pp. 3-6 to 3-17, 1996.

Ann Wollrath and Jim Waldo, "The Java Tutorial Trail:RMI", 2003, section "Writing an RMI Server", retrieved from: http://web.archive.org/web/20030212131158/http://java.sun.com.docs/books/tutorial/rmi/designing.html http://web.archive.org/web/20030212130551/http://java.sun.com/docs/books/tutorial/rmi/implementing.html.

Nettleman; "MICA: A MIB Compiler in Java," 1997, retrieved by other Examiner from scholar.google.com on Jan. 17, 2008.

Subramonian, Venkita; "Middleware Specialization for Memory Constrained Networked Embedded Systems," IEEE, 2004, retrieved by other Examiner on Jan. 15, 2008.

"Vertel Sell Licenses of eORB Technology, CORBA Services Software Packages to Korea Telecom; Technology to be used in Element Management System Prototype," Business Wire, Dec. 11, 2000, retrieved from scholar.google.com by other Examiner on Jan. 15, 2008.

WindowsWMI and CIM Concepts and Terminology, Dec. 4, 2001, retrieved from URL >http://ww.microsoft.com/whdc/archive/WMI-/CIM.mspx?pf=true> by other Examiner on Jan. 17, 2008.

Choy et al., "Reusable Management Frameworks for Third-Generation Wireless Networks," Bell Labs Technical Journal, pp. 171-189, Oct.-Dec. 1999.

Lesk et al., "A Lexical Analyzer Generator," (Copy from Mar. 24, 2002), at http://dinosaur.compilertools.net/.

Johnson, "YACC—Yet Another Compiler Compiler," (Copy from Mar. 24, 2002), at http://dinosaur.compilertools.net/.

GDMO—Guidelines for Definition of Managed Objects; May 29, 2003; Cellsoft; 7 pages.

Mazumdar, "Inter-Domain Management between CORBA and SNMP: WEB-based Management CORBA/SNMP Gateway Approach," 1996, Lucent Technologies, pp. 1-16.

\* cited by examiner

FIG. 11

SNMP TABLE CLASS — 104 fetchRow()
fetchNextRow()
storeRow()
getAttribute()
setAttribute()
getTableEntry()
nextTableEntry()
testAndSetTableEntry()
copyOID()

FIG. 12

SNMP TABLE MOF CLASS — 74 getTableEntry()
nextTableEntry()
testTableEntry()
setTableEntry()
basicTestTableEntry()
getAttribute()
setAttribute()
clearRequest()

FIG. 13

OID CONVERTER CLASS — 78

$MOI2OID()
$OID2MOI()
setDNkey()
getOIDindex()
registerLeaf_AttrName()
registerIndexLevel()
registerConvTable()
deregisterConvTable()

FIG. 14

SNMP OBJECT STREAM CLASS — 82 set()
reset()
/operator<<()
/operator>>()

FIG. 15

OBJECT STREAM CLASS — 110 operator<<()
operator>>()

FIG. 16

SNMP OBJECT STREAM FINDER CLASS — 84 add()
remove()
findIstream()
findOstream()

FIG. 17

SNMP TABLE MAS CLASS — 108

/getTableEntry()
/nextTableEntry()
/setTableEntry()
/basicTestTableEntry()
/clearRequest()

FIG. 18

MOF AGENT CLASS — 106 getAttributes()
getFirst()
getNext()
setAttributes()
createManagedObject()
deleteManagedObject()

SNMP AGENT CODE GENERATION AND SNMP AGENT FRAMEWORK FOR NETWORK MANAGEMENT APPLICATION DEVELOPMENT

CROSS-REFERENCE TO RELATED APPLICATIONS

This application is related to Zhao et al., Ser. No. 10/868,408, entitled "Run-Time Tool for Network Management Application," filed Jun. 15, 2004, commonly assigned to Lucent Technologies, Inc. and incorporated by reference herein.

This application is related to Sridner et al., Ser. No. 10/868,375, entitled "Resource Definition Language for Network Management Application Development," filed Jun. 15, 2004, commonly assigned to Lucent Technologies, Inc. and incorporated by reference herein.

This application is related to Brunell et al., Ser. No. 10/868,239, entitled "View Definition Language for Network Management Application Development," filed Jun. 15, 2004, commonly assigned to Lucent Technologies, Inc. and incorporated by reference herein.

This application is related to Brunell et al., Ser. No. 10/868,656, entitled "Distribution Adaptor for Network Management Application Development," filed Jun. 15, 2004, commonly assigned to Lucent Technologies, Inc. and incorporated by reference herein.

This application is related to Zhao et al., Ser. No. 10/868.250. entitled "Event Management Framework for Network Management Application Development," filed Jun. 15, 2004, commonly assigned to Lucent Technologies, Inc. and incorporated by reference herein.

This application is related to Sridner et al., Ser. No. 10/868,327, entitled "Man aged Object Framework for Network Management Application Development," filed Jun. 15, 2004, commonly assigned to Lucent Technologies, Inc. and incorporated by reference herein.

This application is related to Shen et al., Ser. No. 10/868,217, entitled "Data Management and Persistence Frameworks for Network Management Application Development," filed Jun. 15, 2004, commonly assigned to Lucent Technologies, Inc. and incorporated by reference herein.

BACKGROUND OF THE INVENTION

The invention generally relates to a reusable asset center (RAC) framework in a development environment for network management applications and, more particularly, to a simple network management protocol (SNMP) agent code generation within the development environment and an SNMP agent framework (SAF) within the RAC framework that together provide network management applications with SNMP functionalities between one or more network elements and a network management station (NMS).

While the invention is particularly directed to the art of network management application development, and will be thus described with specific reference thereto, it will be appreciated that the invention may have usefulness in other fields and applications.

By way of background, Guidelines for Definition of Managed Objects (GDMO) and Structure for Management Information (SMI) are existing standards for defining objects in a network. Managed objects that are defined can be accessed via a network management protocol, such as the existing Simple Network Management Protocol (SNMP). Various standards, recommendations, and guidelines associated with GDMO, SMI, and SNMP have been published. GDMO is specified in ISO/IEC Standard 10165/x.722. Version 1 of SMI (SMIv1) is specified in Network Working Group (NWG) Standard 16 and includes Request for Comments (RFCs) 1155 and 1212. Version 2 of SMI (SMIv2) is specified in NWG Standard 58 and includes RFCs 2578 through 2580. The latest version of SNMP (SNMPv3) is specified in NWG Standard 62 and includes RFCs 3411 through 3418.

ISO/IEC Standard 10165/x.722, GDMO, identifies: a) relationships between relevant open systems interconnection (OSI) management Recommendations/International Standards and the definition of managed object classes, and how those Recommendations/International Standards should be used by managed object class definitions; b) appropriate methods to be adopted for the definition of managed object classes and their attributes, notifications, actions and behavior, including: 1) a summary of aspects that shall be addressed in the definition; 2) the notational tools that are recommended to be used in the definition; 3) consistency guidelines that the definition may follow; c) relationship of managed object class definitions to management protocol, and what protocol-related definitions are required; and d) recommended documentation structure for managed object class definitions. X.722 is applicable to the development of any Recommendation/International Standard which defines a) management information which is to be transferred or manipulated by means of OSI management protocol and b) the managed objects to which that information relates.

RFC 1155, Structure and Identification of Management Information for TCP/IP-based Internets, describes the common structures and identification scheme for the definition of management information used in managing TCP/IP-based internets. Included are descriptions of an object information model for network management along with a set of generic types used to describe management information. Formal descriptions of the structure are given using Abstract Syntax Notation One (ASN.1).

RFC 1212, Concise Management Information Base (MIB) Definitions, describes a straight-forward approach toward producing concise, yet descriptive, MIB modules. It is intended that all future MIB modules be written in this format. The Internet-standard SMI employs a two-level approach towards object definition. An MIB definition consists of two parts: a textual part, in which objects are placed into groups, and an MIB module, in which objects are described solely in terms of the ASN.1 macro OBJECT-TYPE, which is defined by the SMI.

Management information is viewed as a collection of managed objects, residing in a virtual information store, termed the MIB. Collections of related objects are defined in MIB modules. These modules are written using an adapted subset of OSI's ASN.1. RFC 2578, SMI Version 2 (SMIv2), defines that adapted subset and assigns a set of associated administrative values.

The SMI defined in RFC 2578 is divided into three parts: module definitions, object definitions, and, notification definitions. Module definitions are used when describing information modules. An ASN.1 macro, MODULE-IDENTITY, is used to concisely convey the semantics of an information module. Object definitions are used when describing managed objects. An ASN.1 macro, OBJECT-TYPE, is used to concisely convey the syntax and semantics of a managed object. Notification definitions are used when describing unsolicited transmissions of management information. An ASN.1 macro, NOTIFICATION-TYPE, is used to concisely convey the syntax and semantics of a notification.

RFC 2579, Textual Conventions for SMIv2, defines an initial set of textual conventions available to all MIB modules. Management information is viewed as a collection of managed objects, residing in a virtual information store, termed the MIB. Collections of related objects are defined in MIB modules. These modules are written using an adapted subset of OSI's ASN.1, termed the SMI defined in RFC 2578. When designing an MIB module, it is often useful to define new types similar to those defined in the SMI. In comparison to a type defined in the SMI, each of these new types has a different name, a similar syntax, but a more precise semantics. These newly defined types are termed textual conventions, and are used for the convenience of humans reading the MIB module. Objects defined using a textual convention are always encoded by means of the rules that define their primitive type. However, textual conventions often have special semantics associated with them. As such, an ASN.1 macro, TEXTUAL-CONVENTION, is used to concisely convey the syntax and semantics of a textual convention.

RFC 2580, Conformance Statements for SMIv2, defines the notation used to define the acceptable lower-bounds of implementation, along with the actual level of implementation achieved, for management information associated with the managed objects.

Network elements need a way to define managed resources and access/manage those resources in a consistent and transparent way. GDMO does not provide a straight forward approach to defining resources. SMI does not provide for an object-oriented design of network management applications. Neither standard provides sufficient complexity of hierarchy or sufficient complexity of control for management of today's complex networks, particular today's telecommunication networks.

The present invention contemplates an SNMP agent code generator and a RAC framework with an SAF for generation of SNMP agent code in a development environment for network management applications that resolves the above-referenced difficulties and others.

SUMMARY OF THE INVENTION

A method of developing one or more application programs that cooperate to manage a distributed system comprising one or more servers is provided. At least one application program is associated with each server. In one aspect, the method includes: a) defining one or more managed objects associated with the distributed system in an object-oriented resource definition language and storing the definition of the one or more managed objects in one or more resource definition language files, wherein the definition of the one or more managed objects is based on an existing design and hierarchical structure of the distributed system, wherein parent-child relationships between the one or more managed objects are identified in the one or more resource definition language files using the object-oriented resource definition language to define the one or more managed objects in relation to the hierarchical structure of the distributed system, b) parsing the one or more resource definition language files to ensure conformity with the object-oriented resource definition language and creating an intermediate representation of the distributed system from the one or more conforming resource definition language files, c) processing the intermediate representation of the distributed system to form one or more programming language classes, one or more database definition files, and one or more script files, d) providing a reusable asset center framework to facilitate development of the one or more application programs, the reusable asset center including an SNMP agent framework that provides SNMP interface functionality to at least one of the one or more application programs, and e) building the one or more application programs from at least the one or more programming language classes, one or more database definition files, one or more script files, and the reusable asset framework.

A method of developing one or more application programs in operative communication to manage a network including one or more servers is provided. At least one application program is associated with each server. The method includes: a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network, b) providing one or more data models with information associated with the one or more managed objects, c) creating one or more network management forum definition files with mapping information between the one or more data models and the one or more managed objects, d) converting the one or more data models into the object-oriented resource definition language and storing the converted information in the one or more resource definition language files, e) parsing the one or more resource definition language files to ensure conformity with the object-oriented resource definition language and creating an intermediate representation of the network from the one or more conforming resource definition language files, wherein the intermediate representation of the network created in the parsing step includes a parse tree, and f) processing the parse tree to form one or more programming language classes, wherein the one or more programming language classes formed include at least one of one or more system classes, one or more module classes, one or more managed object classes, and one or more composite attribute classes.

A method of developing an application program to manage a network is provided. The method including the steps: a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network, b) providing one or more data models with information associated with the one or more managed objects, c) creating one or more network management forum definition files with mapping information between the one or more data models and the one or more managed objects, d) converting the one or more data models into the object-oriented resource definition language and storing the converted information in the one or more resource definition language files, e) parsing the one or more resource definition language files to ensure conformity with the object-oriented resource definition language and creating an intermediate representation of the network from the one or more conforming resource definition language files, wherein the intermediate representation of the network includes object meta-data, f) processing the object meta-data to form one or more programming language classes, one or more database definition files, and one or more script files, wherein the one or more programming language classes formed include at least one of an index class and a query class, g) providing a reusable asset center framework to facilitate development of the application program, the reusable asset center including an SNMP agent framework that provides SNMP interface functionality to at least one of the one or more application programs, and h) building the application program from at least the one or more programming language classes, one or more database definition files, one or more script files, and the reusable asset framework.

Benefits and advantages of the invention will become apparent to those of ordinary skill in the art upon reading and understanding the description of the invention provided herein.

DESCRIPTION OF THE DRAWINGS

The present invention exists in the construction, arrangement, and combination of the various parts of the device, and steps of the method, whereby the objects contemplated are attained as hereinafter more fully set forth, specifically pointed out in the claims, and illustrated in the accompanying drawings in which:

FIG. 11 is a diagram of an embodiment of an SNMP table of the SAF.

FIG. 12 is a diagram of an embodiment of an SNMP table managed object framework (MOF) class of the SAF.

FIG. 13 is a diagram of an embodiment of an object identifier (OID) converter class of the SAF.

FIG. 14 is a diagram of an embodiment of an SNMP object stream class of the SAF.

FIG. 15 is a diagram of an embodiment of an object stream of the SAF.

FIG. 16 is a diagram of an embodiment of an SNMP object stream finder class of the SAF.

FIG. 17 is a diagram of an embodiment of an SNMP table MAS of the SAF.

FIG. 18 is a diagram of an embodiment of an MOF agent of the SAF.

DETAILED DESCRIPTION OF THE PREFERRED EMBODIMENTS

Figure 1:
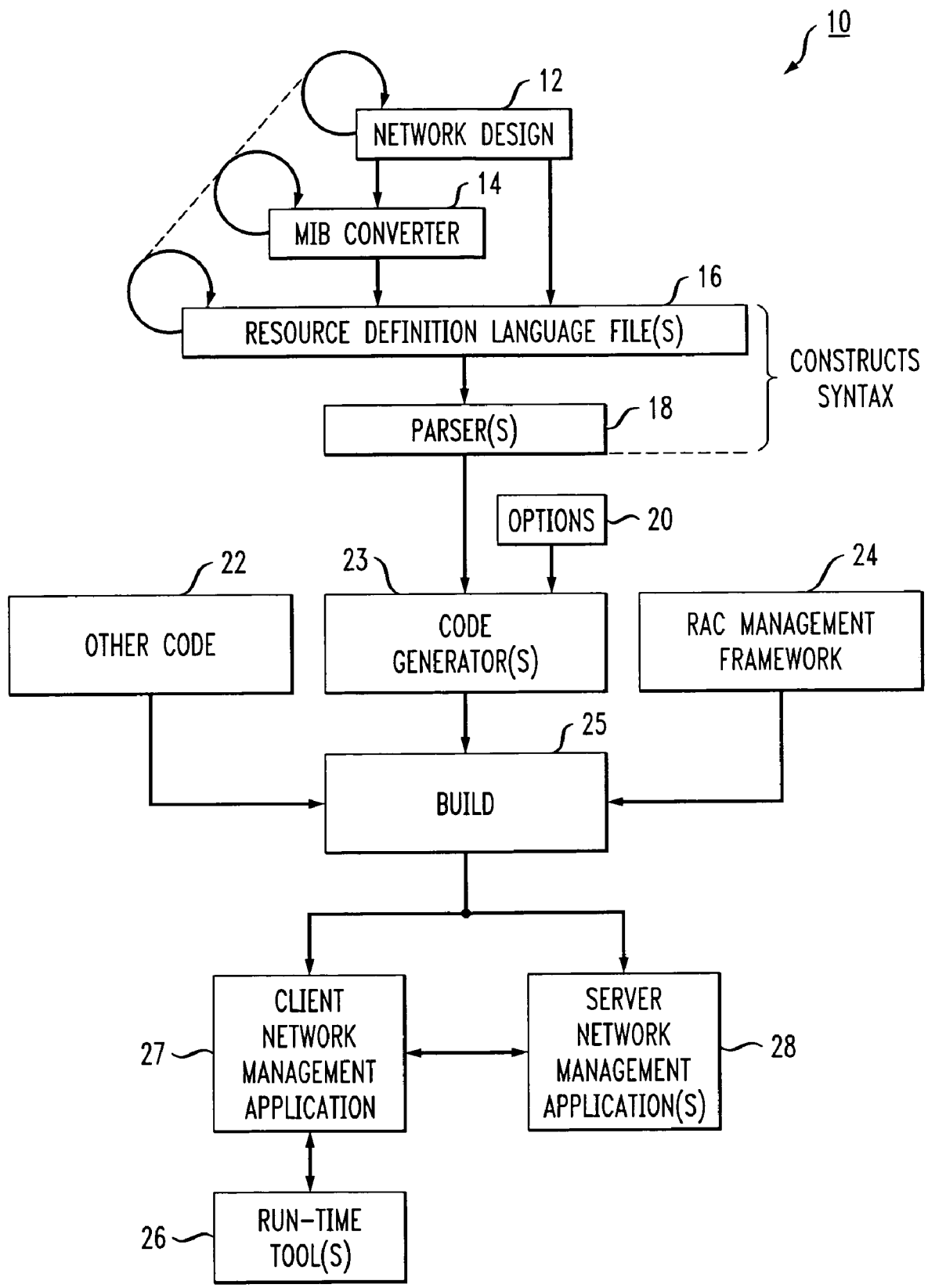
FIG. 1 is a block diagram of an embodiment of a reusable asset center (RAC) development environment for development of network management applications.

Referring now to the drawings wherein the showings are for purposes of illustrating the preferred embodiments of the invention only and not for purposes of limiting same.

In general, a reusable asset center (RAC) development environment for network management application development is provided. RAC, as used herein, generically refers to a reusable set of frameworks for network management application development. The set of frameworks is referred to as the RAC management framework. Network, as used herein, generically refers to a system having a set of resources arranged in a distributed architecture. For example, the RAC development environment may be used to develop network management applications for a TCP/IP-based network or any other type of communication network. For example, the RAC development environment may be used to develop network management applications for landline and/or wireless telecommunication networks. Likewise, the RAC development environment may be used to develop management applications for any type of system having a distributed architecture. Defined as such, the RAC framework is inherently reusable in other networks (i.e., systems). Moreover, major portions of code used to build management applications in the RAC development environment are inherently reusable.

The RAC development environment includes a Managed Object Definition Language (MODL) to specify managed objects in a network or system design and management information associated with the managed objects. The syntax for MODL is object-oriented and the semantics are similar to GDMO. This provides a simplified language for defining data models and acts as a single point translation mechanism to support interacting with different schema types. In essence, MODL provides a protocol-independent mechanism for accessing management information for managed objects within the network design. MODL can be used to define data models describing the managed resources of the network design in terms of managed resources having managed objects, define data types (attributes) representing various resources and objects, and define relationships among the managed resources and objects.

MODL allows network management applications to specify the resources to be managed in a given network design. The RAC development environment also includes MODL code generation from MODL files defining the managed objects and information. This provides automatically generated code to access these resources. Network management application developers can choose to make these resources persistent or transient. Developers can choose among various options to customize the code generation to suit the needs of the operators/maintainers (i.e., providers) of the network. MODL is object-oriented and allows applications to capture complex resources in a systematic way.

The RAC management framework provides an operation, administration, and maintenance (OAM) management framework catering to common OAM needs of the network and its managed resources and objects. The services offered by the RAC management framework range from standard system management functions to generic functions, such as event management, SNMP proxy interface, persistency services, and view management. These services are offered in a protocol-independent and operating system-independent manner.

Most of the common OAM needs of network elements are described in the ITU-T specifications X-730 through X-739 and are known as system management functions. The process leading to development of a RAC management framework provides for systematic and consistent reuse of code. In addition to requirements prescribed by applicable standards, the RAC management framework also provides, for example, functionalities such as persistence, view management and SNMP interface capabilities.

The following requirements of ITU-T X.730 (ISO/IEC 10164-1: 1993(E)) associated with Object Management Function (OMF) services are fully supported in the RAC management framework: 1) creation and deletion of managed objects; 2) performing actions upon managed objects; 3) attribute changing; 4) attribute reading; and 5) event reporting. The RAC management framework also provides, for example, ITU-T X.731-like state management functionality through effective use of callbacks and event reporting.

The RAC management framework provides, for example, a minimal subset of attributes for representing relations as described in ITU-T X.732 (ISO/IEC 10164-3). Certain attributes in the RAC management framework provide, for example, ways to define and create parent and child relationships between managed resources. This enables developers to specify hierarchical structures in the data model representing the network design.

The RAC management framework includes a standalone event management framework to implement event-handling services as described by ITU-T X.734 (ISO/IEC 10164-5). Regarding event-handling services, the RAC management framework, for example, permits: 1) definition of a flexible event report control service that allows systems to select which event reports are to be sent to a particular managing system, 2) specification of destinations (e.g. the identities of managing systems) to which event reports are to be sent, and 3) specification of a mechanism to control the forwarding of event reports, for example, by suspending and resuming the forwarding.

In addition to standard services, the RAC management framework provides additional capabilities associated with the functionality of various potential network elements. The RAC management framework also provides facilities to maintain data integrity in terms of default values and range checks and persistency of managed resources. For example, managed objects can be made persistent and all the OMF services are supported on these persistent managed objects. The managed objects can be manipulated from the back-end using standard Java database connectivity (JDBC) interfaces and synchronization is maintained so as to retain data integrity. This enables developers to manipulate data from multiple interfaces.

The RAC management framework provides a concept of views and view management services. Many network management applications, especially client applications, do not want to access or store the information about all the objects in the data model. The concept of views in the RAC management framework allows developers to create network management applications with access to a subset of the data model. Network management application developers can specify a view using a View Definition Language (VDL) that is included in the RAC development environment. View management services can be used to manage a cross-section of managed objects and associated resources in a single unit called a View. Most of the OMF services are also provided through the views.

The RAC management framework allows transparent distribution of the network management application. This decouples the network management application from changes in platforms and middleware environments. The network management application can be deployed in agent clients and agent servers servicing operation and maintenance centers (OMCs) (i.e., managers). The interface to the OMC can be Common Object Request Broker Architecture (CORBA), SNMP, JDBC, or another standard communication protocol for network management. For example, by simple inheritance, the agent server interface to the OMC can be extended to support other network management protocols, such as common management information protocol (CMIP), extensible markup language (XML), etc.

One of the key advantages for developers is that the RAC development environment automates development of portions of code with respect to the overall network management application. The RAC development environment generates the code based on the data model defined in MODL. The objects in the model get translated into subclasses in MODL code and access to the objects is generated using a build process in the RAC development environment. If the data model changes, corresponding MODL files can be revised and corresponding MODL code can be re-generated. Thus, streamlining change management of the network management application. The revised network management application is provided in a consistent and controlled manner through the object-oriented programming characteristics of MODL and the RAC management framework.

With reference to FIG. 1, a RAC development environment 10 includes a network design 12, an MIB converter 14, a resource definition language file(s) block 16, a parser(s) block 18, an options block 20, an other code block 22, a code generator(s) block 23, a RAC management framework block 24, a build process 25, a run-time tool(s) block 26, a client network management application 27, and a server network management application(s) 28. The RAC development environment 10 also includes computer hardware for storing and/or operating the various software development processes shown in FIG. 1. The computer hardware used in conjunction with the RAC development environment 10 may range from a network with multiple platforms to a stand-alone computer platform. The various processes for software development described herein may operate on any suitable arrangement of various types of computer equipment with various types of operating systems and various types of communication protocols. Thus, it is to be understood that the software development processes described herein do not require any specialized or unique computer architecture for the RAC development environment 10. The RAC development environment 10 represents an exemplary development cycle used by developers when preparing network management applications. Typically, developers begin with a design or data model for a network or system. This is depicted by the network design 12 and may include any design documentation describing the network and its resources or elements that is useful to the developers (i.e., data model). The network design 12 may include an existing MIB for one or more network resources.

If the network design 12 includes one or more MIBs, the MIB converter 14 converts the information in the MIBs to resource definition language file(s) 16. The developers use the network design 12 as source data for representing the remaining network resources and objects to be managed in the resource definition language file(s) block 16. The developers may also use the network design 12 to integrate the file(s) created by the MIB converter 14 with the other file(s) in the resource definition language file(s) block 18. Thus, the resource definition language file(s) block 16 includes one or more files defining the resources and objects within constructs and in appropriate syntax for one or more resource definition languages associated with the RAC development environment 10. Additional files may be included in the resource definition language file(s) block 18 defining one or more views of the resources and/or objects.

Files from the resource definition language file(s) block 18 are provided to an appropriate parser in the parser(s) block 18 to check for construct and syntax compliance and to build a parse tree. The parse tree is provided to the code generator(s) block 23. The options block 20 specifies certain options related to code generation by the code generator(s) block 23. The code generation options are customized by the developers based on the network design, parse tree, developer preferences, and/or network management application customer/user preferences.

The code generator(s) block 23 generates code for each managed resource and object defined in the resource definition language file(s) 16. The generated code provides various hooks and callbacks, which can be used by the developers to customize the flow of operations and behavior of the network management applications. The generated code primarily includes extensions of RAC management framework classes and eases the burden of coding and maintaining repeated functionality. The RAC management framework block 24 includes code organized in a group of subordinate frameworks. The RAC management framework 24 is implemented as a set of interrelated patterns (i.e., frameworks) that provide common functionality which can be selectively associated with the managed resources/objects and included in the generated code. The other code block 22 includes, for example, user-specific code and main methods which perform the initialization to get the final network management application.

The generated code from the code generator(s) block 23 is compiled and linked with code from the other code block 22 and the RAC management framework block 24 in the build process 25 to create a client network management application 27 and one or more server network management applications 28. At any stage in the application development, developers can add, delete or modify the managed resources/objects in the resource definition language files, re-generate the resource definition language code with new and/or revised managed resources/objects, and re-build the network management applications.

Figure 2:
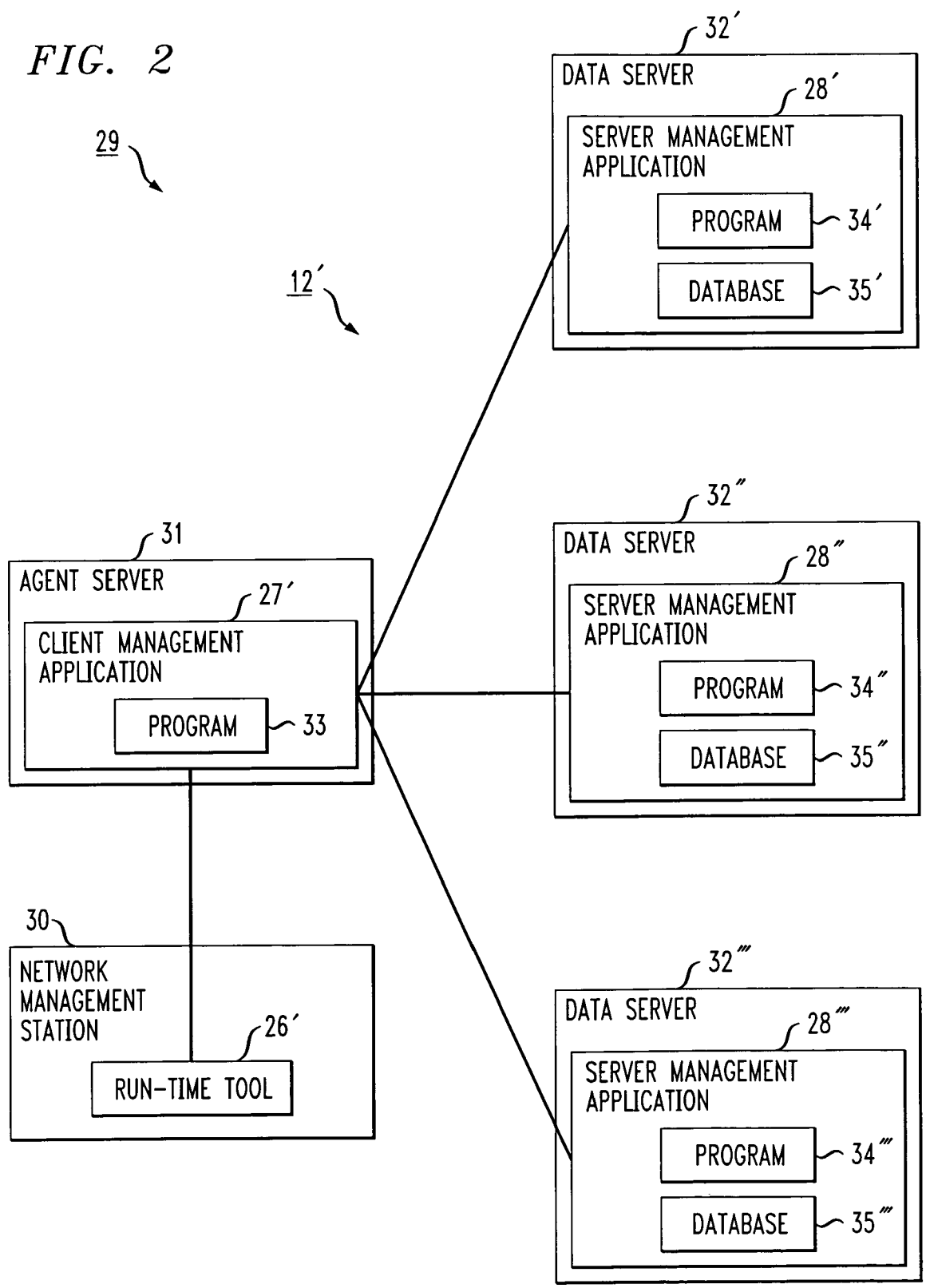
FIG. 2 is a block diagram of an embodiment of a run-time network management environment with network management applications developed by the RAC development environment.

With reference to FIG. 2, an embodiment of a run-time network management environment 29 includes a network design 12' to be managed in communication with a network management station 30. The network design includes an agent server 31 in communication with a first data server 32', a second data server 32", and a third data server 32'''. The network management station 30 includes an embodiment of the run-time tool 26'. The agent server 31 includes an embodiment of the client network management application 27'. The data servers 32', 32", 32''' each include a corresponding embodiment of the server network management application 28', 28", 28'''. The client network management application 27' includes an application program 33. Each server network management application 28', 28", 28''' includes a corresponding application program 34', 34", 34''' and management database 35', 35", 35'''.

Each of the data servers 32', 32", 32''' includes one or more objects to be managed. For example, if any two network resources 32 are the same and the objects to be managed for both resources are also the same, the corresponding server network management application 28 may be the same on both resources. Otherwise, the application programs 34 and management databases 35 in the client network management applications are different based on the type of resource and/or type of objects to be managed.

The run-time tool 26' controls and monitors the data servers 32', 32", 32''' through communications with the client network management application 27'. The client network management application 27' passes communications from the run-time tool 26' to the appropriate server network management application 34. The client network management application 27' also passes communications from the server network management applications 34', 34", 34''' to the run-time tool 26'.

Figure 3:
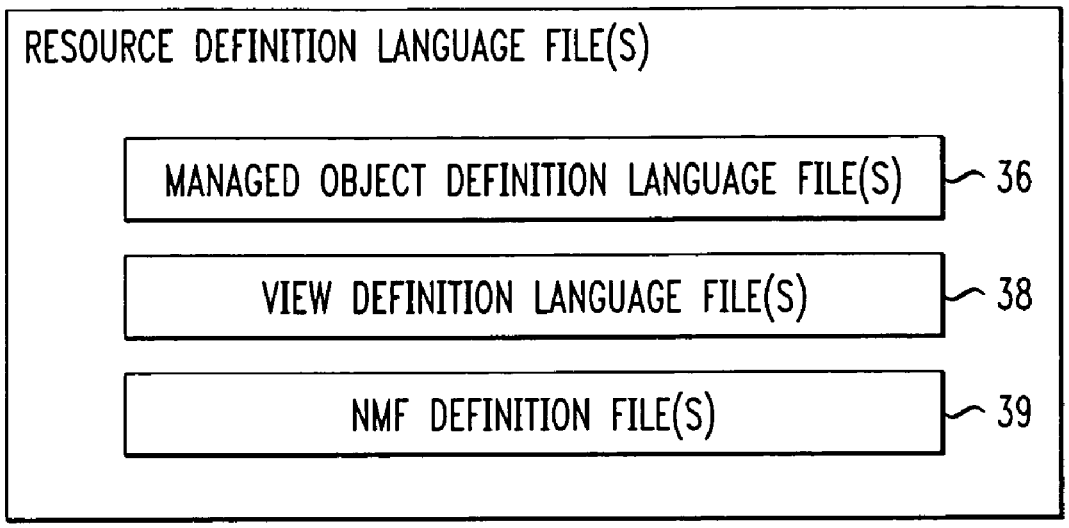
FIG. 3 is a block diagram of an embodiment of a resource definition language file(s) block of the RAC development environment.

With reference to FIG. 3, an embodiment of the resource definition language file(s) block 16 includes managed object definition language (MODL) file(s) 36, view definition language (VDL) file(s) 38, and network management forum (NMF) file(s) 39. The VDL file(s) 38 are optional. MODL is a language used to organize the managed resources. MODL allows for definition of managed resources as managed object classes. The MODL file(s) 36 include constructs to organize the data model of the network design into managed object classes. This facilitates readability and provides a mechanism for abstracting the managed resources in the network design. VDL is a specification language based on MODL that describes managed object views. Each VDL file 38 (i.e., managed object view) is a collection of managed attributes that are scattered across various managed objects. The VDL file(s) 38 are entities that are essentially wrappers for corresponding managed objects included in the respective managed object views. The NMF file(s) 39 acts as an input for generating the classes required to access the managed objects and their attributes. The NMF file(s) 39 supply mapping information between MIB tables and managed object classes.

Figure 4:
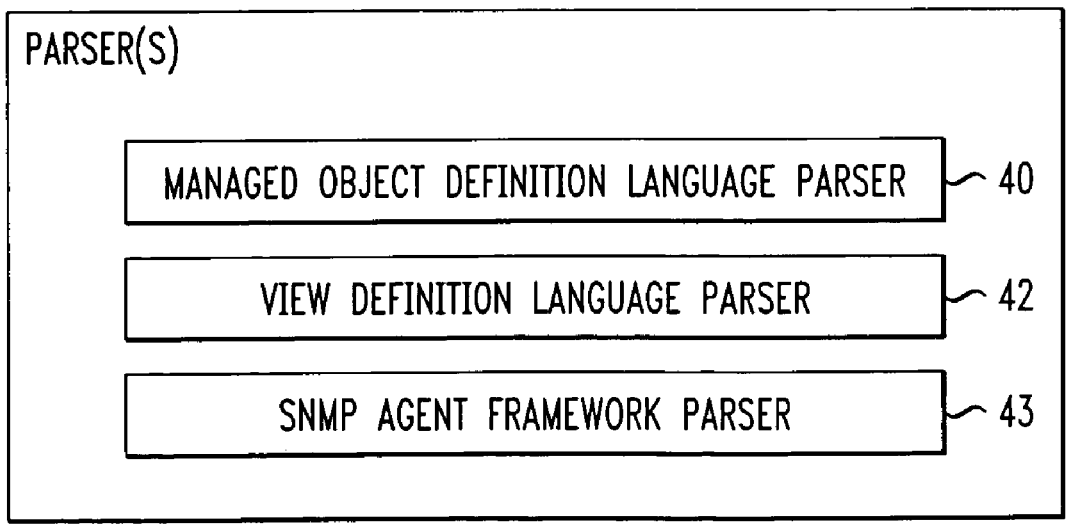
FIG. 4 is a block diagram of an embodiment of a parser(s) block of the RAC development environment.

With reference to FIG. 4, an embodiment of the parser(s) block 18 includes an MODL parser 40, a VDL parser 42, and an SNMP agent framework (SAF) parser 43. The VDL parser 42 is optional. The MODL parser 40 receives the MODL file(s) 36 and builds an intermediate representation of the file contents that includes a parse tree and object meta-data. The parse tree and object meta-data is provided to the code generator(s) 23 for generation of MODL and database management code. The object meta-data is also provided to the VDL parser 42. The VDL parser 42 receives the VDL file(s) 38 and the object meta-data and builds view meta-data. The object meta-data and view meta-data are provided to the code generator(s) 23 for generation of VDL code. The SAF parser 43 receives MODL files created by the MIB converter and the NMF files and creates an output that is provided to the code generator(s) 23 for generation of SAF code.

Figure 5:
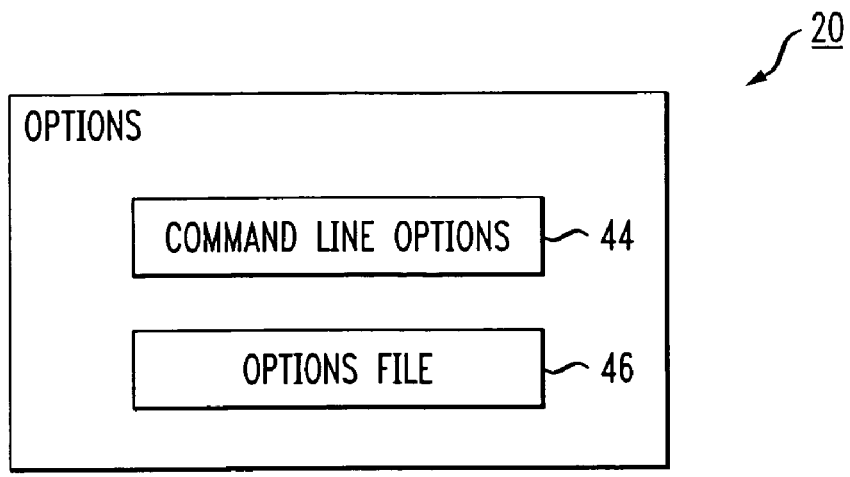
FIG. 5 is a block diagram of an embodiment of an options block of the RAC development environment.

With reference to FIG. 5, an embodiment of the options block 20 includes command line options 44 and an options file 46. The options file 46 is optional. The command line options 44 include arguments and parameters to commands to initiate code generation. Various combinations of arguments and parameters are optional and permit developers to customize code generation to the current stage of application development and their current needs. The options file 46 is a sequence of commands in a file that similarly permit developers to customize code generation. The options file 46, for example, can specify reuse of code that was generated previously so that current code generation may be limited to areas that have changed.

Figure 6:
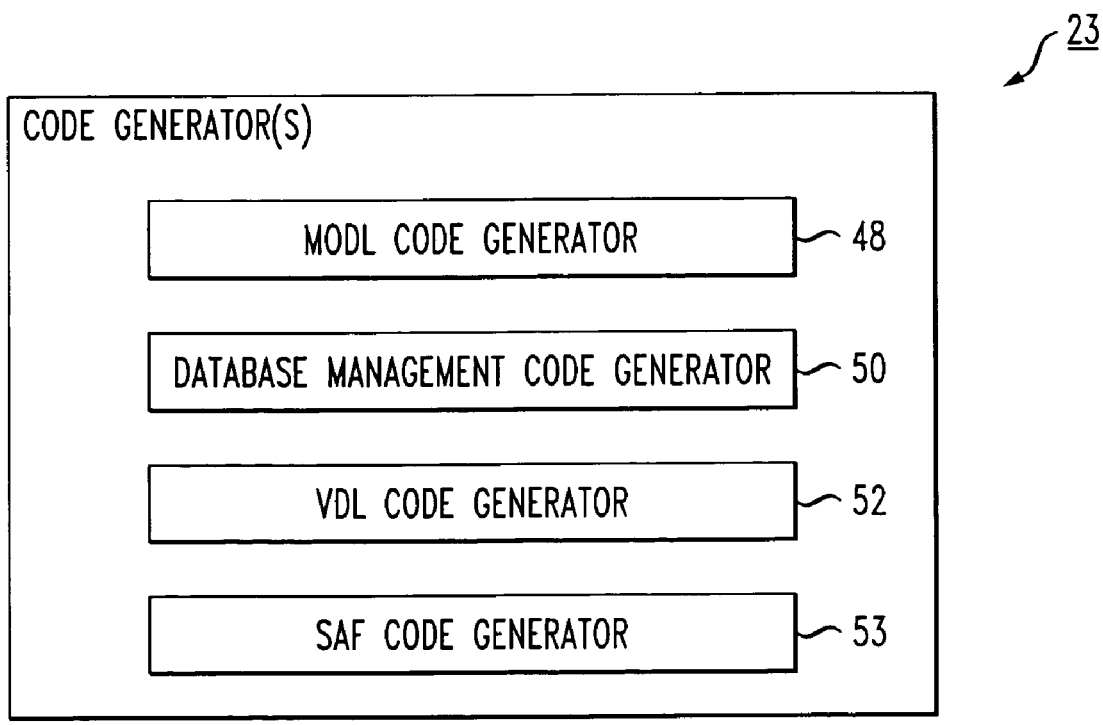
FIG. 6 is a block diagram of an embodiment of a code generator(s) block of the RAC development environment.

With reference to FIG. 6, an embodiment of the code generator(s) block 23 includes an MODL code generator 48, a database management code generator 50, a VDL code generator 52, and an SAF code generator 53. The MODL code generator 48 receives the parse tree from the MODL parser 40 and instructions from the option(s) block 20 for generation of MODL code. The MODL code generator 48 generates code for instantiating and accessing the managed resources and objects in the network design from the MODL file(s) 36. The database management code generator 50 receives object meta-data from the MODL parser 40 and instructions from the option(s) block 20 for generation of database management code. The database management code generator 50 generates database schema for transient and/or persistent managed objects and trigger definitions for database updates from the MODL file(s) 36. The VDL code generator 52 receives view meta-data from the VDL parser 42 and instructions from the option(s) block 20 for generation of VDL code. The VDL code generator 52 generates code for defining managed object views from the MODL file(s) 36 and VDL file(s) 38. The SAF code generator 53 generates code for providing an SNMP interface to managed object resources.

Figure 7:
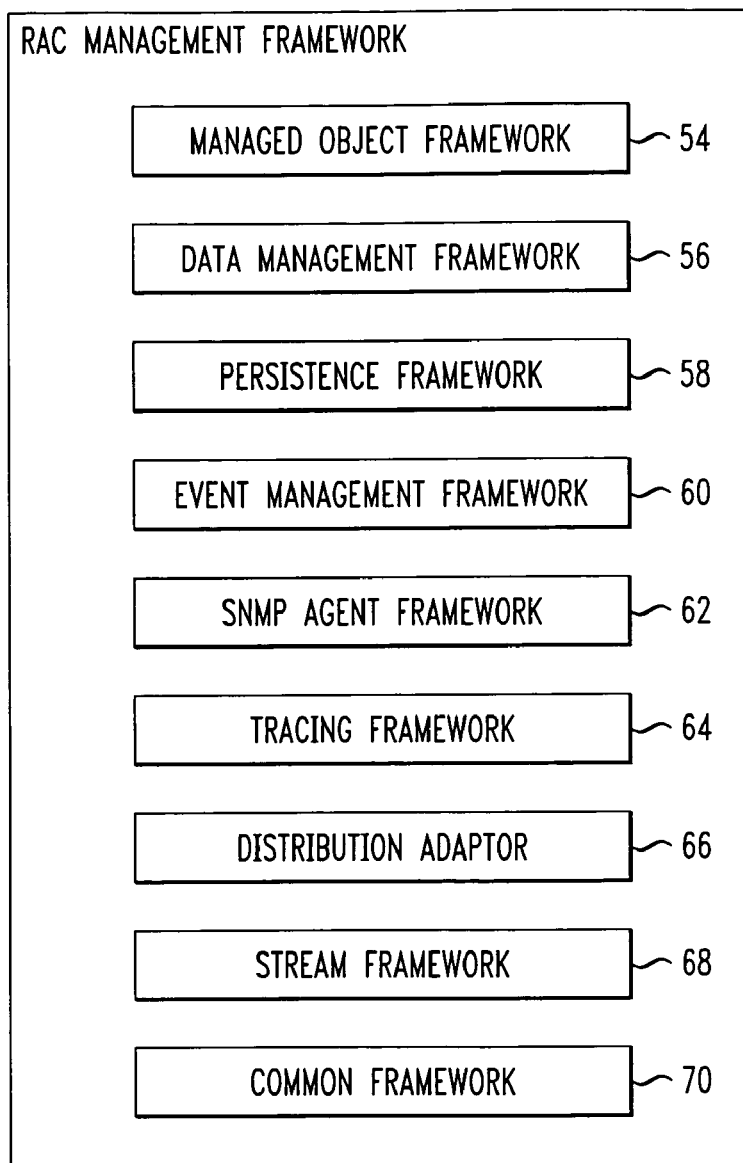
FIG. 7 is a block diagram of an embodiment of a RAC management framework block of the RAC development environment.

With reference to FIG. 7, an embodiment of the RAC management framework block 24 includes a managed object framework (MOF) 54, a data management framework (DMF) 56, a persistence framework (PF) 58, an event management framework (EMF) 60, an SNMP agent framework (SAF) 62, a tracing framework 64, a distribution adaptor (DA) 66, a stream framework 68, and a common framework 70. MOF 54 includes a set of classes that work in close cooperation to provide the management functionality of the network management applications. The MOF 54 is the core framework and provides object representations and interfaces for network management applications.

DMF 56 is used to make certain managed objects persistent and makes these persistent managed objects accessible to network management stations (NMSs). The DMF 56 also maintains consistency of the persistent data and permits various servers within the network design to share the data, for example, in real-time. PF 58 provides a portable persistent database interface to network management applications. This permits MODL and other coding for the applications to be developed transparent of any underlying database implementation.

EMF 60 includes a centralized event management server that performs event management routing and broadcasting. The EMF 60 unifies various system event generations and handling schemes into one uniform event processing model. SAF 62 provides network management applications with a gateway between MOF and SNMP protocols. SAF 62 acts as a proxy for SNMP protocol. SAF 62 also provides an interface definition language (IDL) interface through which other system elements can communicate using CORBA.

The tracing framework 64 provides network management applications with an option to emit tracing information that can be saved to a log file for subsequent problem analysis. The tracing framework 64 provides developers and users with multiple tracing levels. DA 66 is an adaptation layer framework for transparent distributed programming. DA 66 provides a pattern for utilizing client and server object proxies to allow code for distributed applications to be written without having to explicitly deal with distribution issues.

The stream framework 68 supports the encoding of objects into a stream and the complementary reconstruction of objects from the stream. The stream framework 68 permits objects to be passed by value from the client to the server through various communication mechanisms. The common framework 70 includes a set of utility classes that are used across the RAC management framework 24. The common framework 70 reduces redundancy across the RAC management framework 24, thereby reducing code for network management applications.

Figure 8:
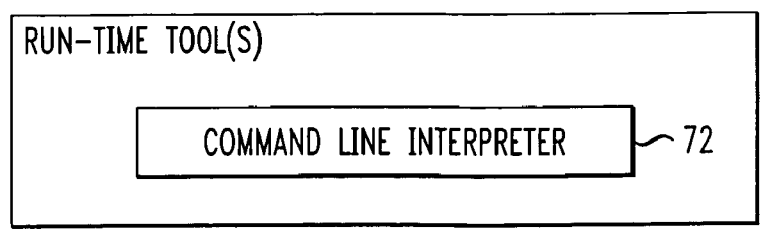
FIG. 8 is a block diagram of an embodiment of a run-time tool(s) block of the RAC development environment.

With reference to FIG. 8, an embodiment of the run-time tool(s) block 26 includes a command line interpreter 72. The command line interpreter 72 is a utility for monitoring and controlling managed objects associated with a network management application. The command line interpreter 72 includes interactive and batch modes of operation.

The SAF code generator 53 (FIG. 6) converts data models represented in SNMP SMI (i.e., MIB) format to MODL files 36 (FIG. 3). More specifically, the SAF code generator 53 (FIG. 6) is a wrapper over Emissary an MIB compiler developed by Epilogue Technology Corp., Redwood City, Calif. Epilogue was purchased by Integrated Systems, Inc., Sunnyvale, Calif. which was later purchased by Wind River Systems, Inc., Alameda, Calif. Emissary is part of an SNMP agent toolkit from Wind River. The SAF code generator 53 (FIG. 6) generates the code necessary for compiling an SAF agent.

The SAF code generator 53 (FIG. 6) is a code generator that operates in conjunction with the SAF 62 (FIG. 7) when SNMP agent code is required in certain network management applications 27, 28 (FIG. 1). The SAF code generator 53 (FIG. 6) generates C/C++ code for SNMP application MIBs. The SAF code generator 53 (FIG. 6) extends the Emissary MIB compiler from Wind River's SNMP agent toolkit. The SAF code generator 53 (FIG. 6) supports Emissary's base options. For details on the base options one may refer to the Emissary User's Manual and Porting Guide. The extended options are invoked on the command-line using the following command:

SafGen [-o outfile] [-oid] [-oid.h] [-moftable] [-modl]
    [-modoc] mibfile1 [mibfile2 . . . ]

The SAF code generator 53 (FIG. 6) receives SNMP MIBs compliant with SMI specifications as input. Multiple MIB files can be specified in the command as shown above. If an MIB depends on the objects or textual conventions defined in another MIB, the other MIB is listed first in the command line. Since the SAF code generator 53 (FIG. 6) is a wrapper over Emissary, the SafGen command may also include command line options associated with Emissary. The options specific to the SAF code generator 53 (FIG. 6) are discussed herein. For command line options associated with Emissary refer to the Emissary user's guide.

The -moftable command line option generates SnmpTableMof subclass C++ definition and implementation files. This option is compliant with code generated by the MODL code generator 48 (FIG. 6).

The -modl command line option generates an MODL interface for an SNMP application MIB. The MODL code generator 48 (FIG. 6) can use the MODL file for further code generation.

A configuration file (e.g., NMF definition file(s) 39 (FIG. 3)) associated with SAF agent code generation acts as an input for generating the classes required to access the managed objects and associated attributes corresponding to each table. A developer prepares the NMF definition file(s) 39 (FIG. 3) using information about the different managed objects. The NMF definition file(s) 39 (FIG. 3) supply information to the SAF code generator 53 (FIG. 6) with mapping information between MIB tables and managed object classes with distinguished names. The NMF definition file(s) 39 (FIG. 3) also specify customizations to the generated code.

The NMF definition file(s) 39 (FIG. 3) provide information to the SAF code generator 53 (FIG. 6) such as prefix, suffix, and index mapping information.

Flags are available in the NMF definition file(s) 39 (FIG. 3). For example, a NO_PREFIX_STRIP flag may be included. Traditionally, MIB variables are defined with a corresponding module name prefix and in many cases it is desirable to remove the prefixes. By default, the SAF code generator 53 (FIG. 6) removes leading common characters (i.e., prefixes) in a particular module. When the NO_PREFIX_STRIP flag is defined in the NMF definition file(s) 39 (FIG. 3), the SAF code generator 53 (FIG. 6) is instructed not to strip the leading common characters from the MIB variables.

APPLICATION is a parameter that may be used in the NMF definition file(s) 39 (FIG. 3) to identify a module name. The APPLICATION is used in prefixing the attrDefns statements generated from the -moftable options. The APPLICATION is also used as a prefix to "include files" (e.g., <APPLICATION>Oid.h, <APPLICATION>Leaf.h). Accordingly, the files generated out of -skel and -leaf have the same prefix names.

The format of the mapping between MIB table and the managed objects is as given in the mnf.cfg file. An example of this mapping is provided below:

TableName1 <DistinguishedName> <managedobjectclass>
TableName2 <DistinguishedName> <managedobjectclass>
TableName3 <DistinguishedName> <managedobjectclass>

Figure 9:
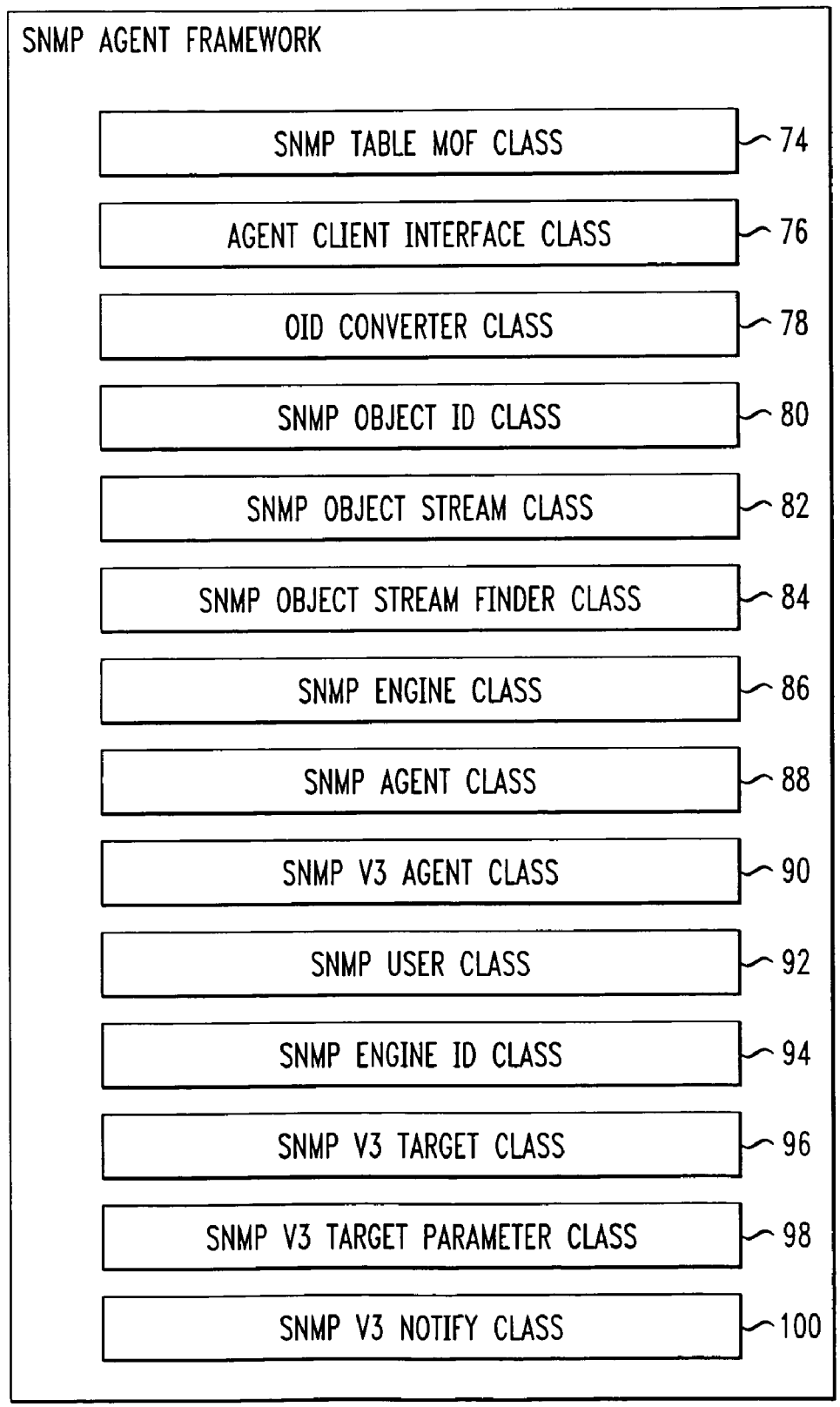
FIG. 9 is a block diagram of an embodiment of the SNMP agent framework (SAF).

With reference to FIG. 9, the SAF 62 includes an SNMP table MOF class 74, an agent client interface class 76, an object identifier (OID) converter class 78, an SNMP object identifier (ID) class 80, an SNMP object stream class 82, an SNMP object stream finder class 84, an SNMP engine class 86, an SNMP agent class 88, an SNMP V3 agent class 90, an SNMP user class 92, an SNMP engine ID class 94, an SNMP V3 target class 96, an SNMP V3 target parameter class 98, and an SNMP V3 notify class 100. The SAF 62 provides SNMP agent functionalities to a given network element. The SAF 62 provides object-oriented interfaces for SNMP MIB instrumentation for both SNMP requests and SNMP traps. The SNMP requests to the network element are converted to a call to an AttributeClientInterface. This provides a common IDL interface for managed objects.

The SAF 62 provides an object-oriented interface to SNMP protocol and an SNMP interface to managed object resources stored in a containment tree representing the hierarchy of the network. The SAF 62 acts as a proxy for SNMP protocol and provides a conversion mechanism to MOF protocol. The SAF 62 supports "get," "get next," "set," and "trap" commands in conjunction with manipulation of MIB variables. Additionally, the SAF 62 provides an IDL interface through which users can communicate with network elements using CORBA.

The SNMP table MOF class 74 is a class providing the representation for MIB tables and converting the SNMP requests to MOF. This class works with the data servers 32 (FIG. 2) to provide SNMP MIB instrumentation. The SNMP table MOF class 74 translates SNMP packets to MOF commands and data using the OID converter class 78 and the SNMP object stream class 82 and forward associated calls to an MOF agent. When a response to the MOF call returns, the values and error codes are translated back to SNMP packets. The agent client interface class 76 is a helper class for a client network management application 27 (FIG. 2) to communicate with an agent server 31 (FIG. 2). This class hides streaming mechanisms and exception handling.

The OID converter class 78 translates SNMP object identifiers into MOF representations (e.g., distinguished names and attribute names) and vice-versa. The SNMP table MOF class 74 uses this class for instrumentation. For each MIB table and managed object pair there is a corresponding OID converter. The SNMP object ID class 80 is an object oriented representation of SNMP MIB object identifiers. This class stores object IDs in an array and provides a length of the array. For example, OID=1.3.4.5.6.1542 is stored as {1, 3, 4, 5, 6, 1542}, 6. The SNMP object ID class 80 is used by the OID converter class 78 to translate back and forth between the MOF and SNMP protocols.

The SNMP object stream class 82 specializes the abstract base class object stream to externalize and internalize SNMP packets to a data stream compatible with the network application programs 27, 28 (FIG. 1) developed using the RAC development environment 10 (FIG. 1). This class stores information related to SNMP packets in the form of data types SNMP_PKT_T and VB—T (varibands) as defined in Wind River's SAF agent toolkit. Refer to Wind River's SAF agent toolkit manuals for more information on the contents of these packets. The SNMP object stream finder class 84 is a singleton class that is used as a map between data types and corresponding input and output stream function pointers. This class is used by the SNMP object stream class 82 to get function names while externalizing and internalizing SNMP packet data.

The SNMP engine class 86 encapsulates an SNMP engine associated with Wind River's SNMP agent toolkit and provides utility methods to set the properties of the SNMP agent. The SNMP agent class 88 extends the basic SNMP engine class 86 and supports TMN alarms and state change reports. This class also provides instrumentation of agent data. More specifically, agent port information, community names, and trap destinations are provided by the SNMP agent class 88. The SNMP V3 agent class 90 extends the basic SNMP agent class 88 to support features of SNMP, version 3. This class implements the user security model (USM) and provides the ability to populate the user table MIB.

The SNMP user class 92 is an abstract base class encapsulating the characteristics of the user. The SNMP engine Id class 94 provides support for creating an engine ID for the SNMP agents. The SNMP V3 target class 96 provides an abstract base class for encapsulating SNMP target characteristics. The SNMP V3 target parameter class 98 provides an abstract base class for encapsulating characteristics of the SNMP target parameter. The SNMP V3 notify class 100 provides an abstract base class for encapsulating characteristics of notify MIB tables.

Figure 10:
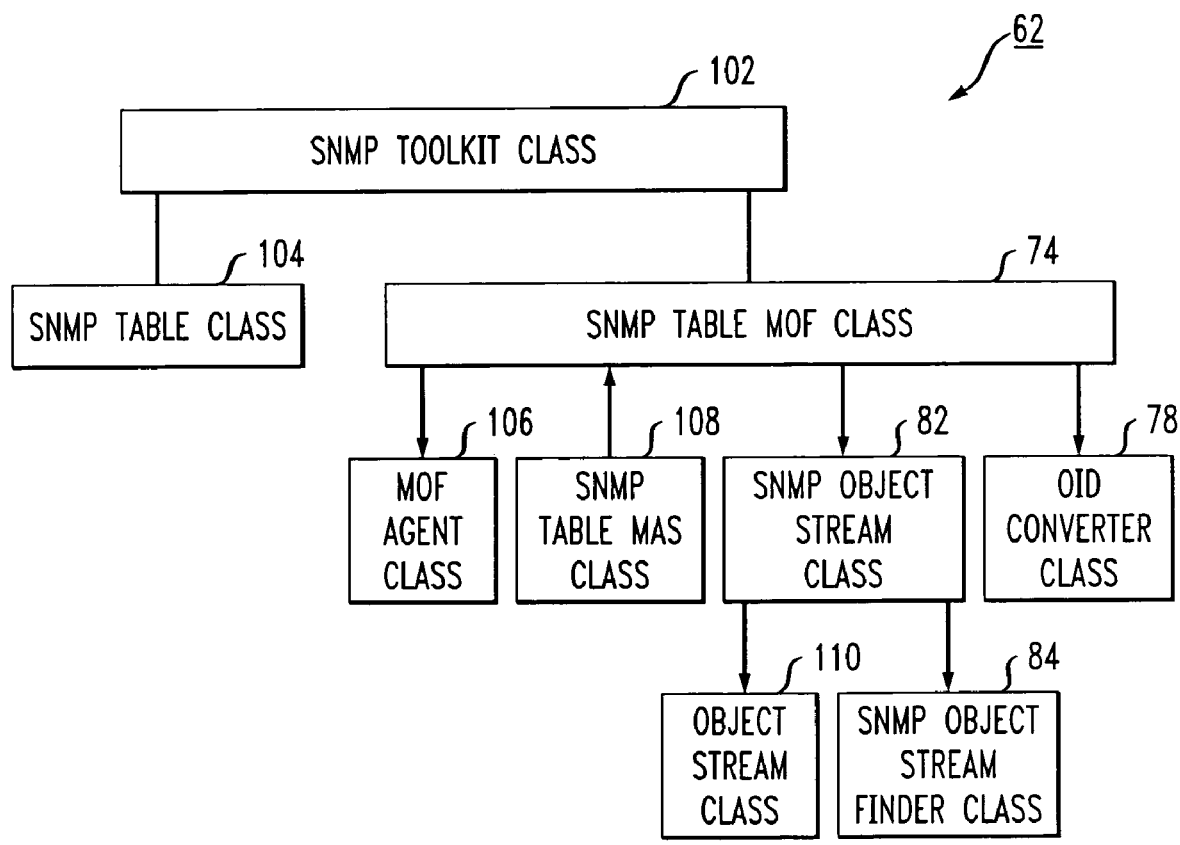
FIG. 10 is a block diagram of an embodiment of the SAF showing interactions between certain classes.

With reference to FIG. 10, interactions between certain classes within the SAF 62 are shown. In the embodiment depicted, the SAF 62 includes the SNMP table MOF class 74, OID converter class 78, SNMP object stream class 82, SNMP object stream finder class 84, an SNMP toolkit class 102, an SNMP table class 104, an MOF agent class 106, an SNMP table MAS class 108, and an object stream class 110. These SAF classes interact with each other to achieve the proxy capability for the MOF 54 (FIG. 7). The SNMP toolkit class 102 interacts with the SNMP table class 104 and the SNMP table MOF class 74. The SNMP table MOF class 74 receives communications from the SNMP table MAS class 108 and sends communications to the OID converter class 78, SNMP object stream class 82, and MOF agent class 106. The SNMP object stream class 82 sends communications to the SNMP object stream finder class 84 and object stream class 110.

With reference to FIG. 11, the SNMP table class 104 includes coded procedures for fetchRow( ), fetchNextRow( ), storeRow( ), getAttribute( ), setAttribute( ), getTableEntry( ), nextTableEntry( ), testAndSetTableEntry( ), and copyOID( ).

With reference to FIG. 12, the SNMP table MOF class 74 includes coded procedure for getTableEntry( ), nextTableEntry( ), testTableEntry( ), setTableEntry( ), basicTestTableEntry( ), getattribute( ), setattribute( ), and clearRequest( ).

With reference to FIG. 13, the OID converter class 78 includes coded procedures for $MOI2OID( ) (i.e., managed object instance-to-object identifier cross reference), $OID2MOI( ) (i.e., object identifier-to-managed object instance cross reference), setDNkey( ), getOIDindex( ), registerLeaf_AttrName( ), registerIndexLevel( ), registerConvTable( ), and deregisterConvTable( ).

With reference to FIG. 14, the SNMP object stream class 82 includes coded procedures for set( ), reset( ), /operator<<( ), and /operator>>( ).

With reference to FIG. 15, the object stream class 110 includes coded procedures for operator<<( ), and operator>>( ).

With reference to FIG. 16, the SNMP object stream finder class 84 includes coded procedures for add( ), remove( ), findIstream( ), and findOstream( ).

With reference to FIG. 17, the SNMP table MAS class 108 includes coded procedures for /getTableEntry( ), /nextTableEntry( ), /setTableEntry( ), /basicTestTableEntry( ), and /clearRequest( ).

With reference to FIG. 18, the MOF agent class 106 includes coded procedures for getAttributes( ), getFirst( ), getNext( ), setAttributes( ), createManagedObject( ), and deleteManagedObject( ).

Figure 19:
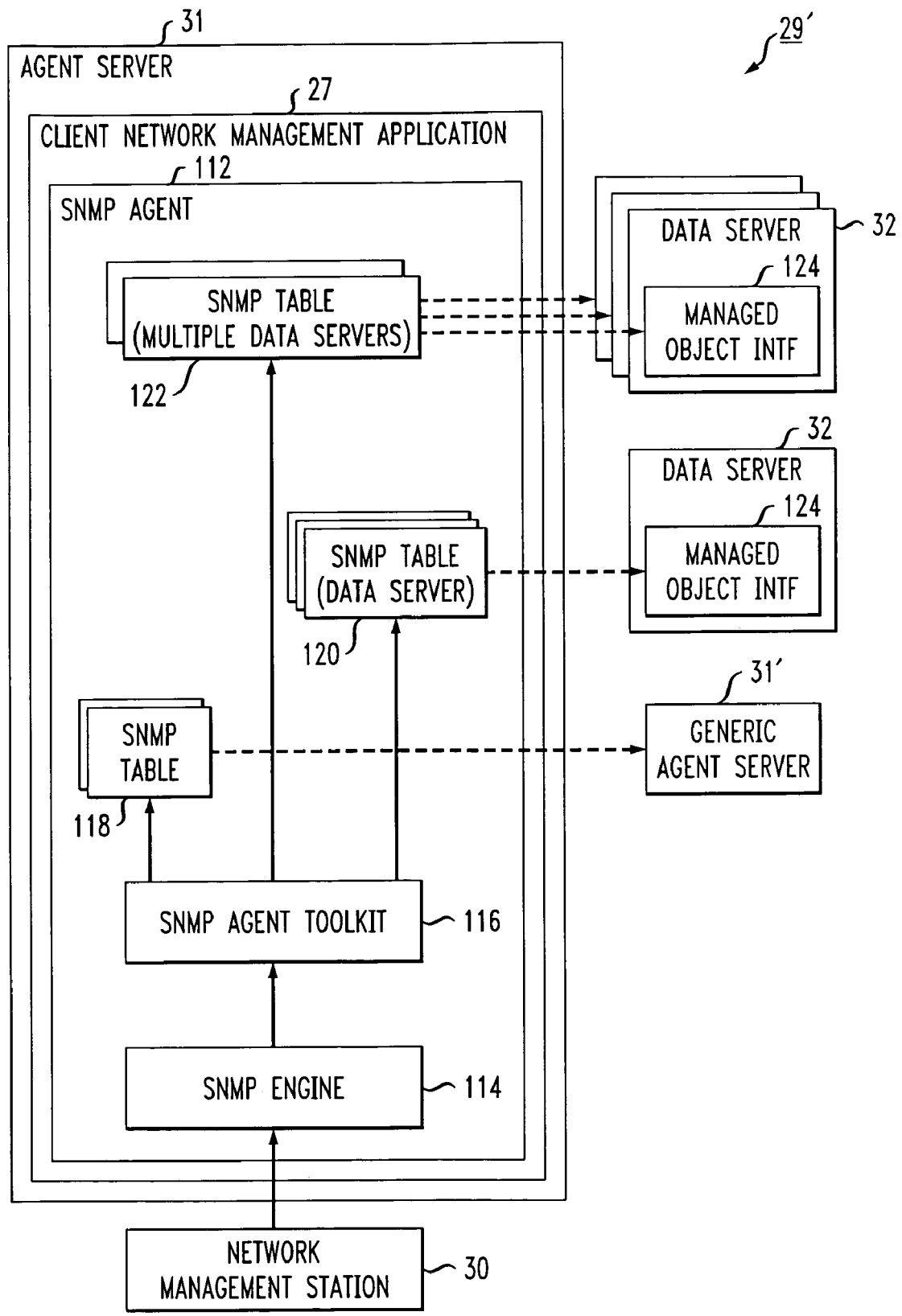
FIG. 19 is a block diagram of an embodiment of a run-time network management environment showing aspects of an SAF architecture.

With reference to FIG. 19, an embodiment of a run-time network management environment 29' includes the NMS 30, agent server 31, a generic agent server 31', and a plurality of data servers 32. The agent server 31 includes the client network management application 27 which includes an SNMP agent 112. The SNMP agent includes an SNMP engine 114, an SNMP agent toolkit 116, a plurality of SNMP tables 118, a plurality of SNMP tables (data server) 120, and a plurality of SNMP tables (multiple data servers) 122. Each data server 32 includes a managed object interface 124. The SNMP agent 112 provides a gateway between SNMP and MOF protocol. The unified modeling language (UML) diagram shows how SAF classes co-ordinate together to act as proxy for SNMP requests from the NMS 30. The OID converter class 78 (FIG. 10) is used to convert the SNMP MIB managed object instance (MOI) to a managed object identifier (OID). Once the translation is done, the data is streamed to the MOF 54 (FIG. 7) using the SNMP object stream class 82 (FIG. 10) and the MOF agent class 106 (FIG. 10). The requested data is retrieved from the MOF 54 (FIG. 7) and converted back to SNMP data.

As shown in FIG. 19, the data request from the NMS 30 is received by the SNMP engine 114. The SNMP engine 114 routes the request to an appropriate SNMP table 118, 120, 122 via the SNMP agent toolkit 116. If the request is associated with the generic agent server 31, the request is routed to the SNMP table 118 which communicates the request to the generic agent server 31. If the request is associated with an individual data server 32, the request is routed to the SNMP table (data server) 120 which communicates the request to the managed object interface 124 associated with the individual data server 32. If the request is associated with a plurality of data servers 32, the request is routed to the SNMP table (multiple data servers) 122 which communicates the request (e.g., get, get next, set, create managed object, or delete managed object) to the managed object interface 124 associated with each of the plurality of data servers 32.

Figure 20:
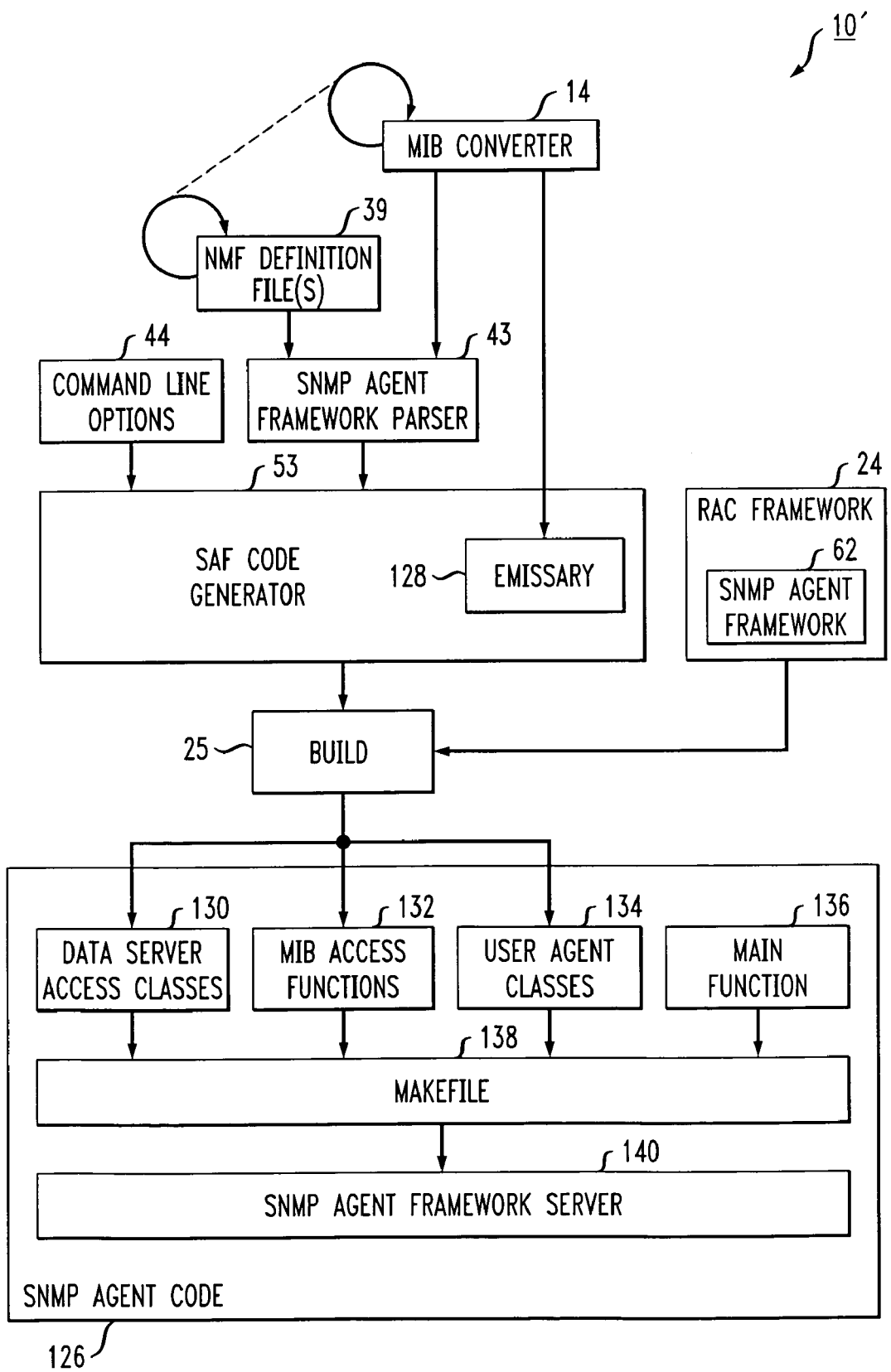
FIG. 20 is a block diagram of an embodiment of the RAC development environment showing aspects of the environment that contribute to generation of SNMP agent code.

With reference to FIG. 20, an embodiment of the RAC development environment 10' includes the MIB converter 14, RAC framework 24, build process 25, NMF definition files 39, SNMP agent framework parser 43, command line options 44, SAF code generator 53, and SNMP agent code 126. The RAC framework 24 includes the SAF 62. The SAF code generator 53 includes Emissary 128. The SNMP agent code 126 includes data server access classes 130, MIB access functions 132, user agent classes 134, a main function 136, a makefile 138, and an SNMP agent framework server 140. The SNMP agent code 126 includes an SNMP agent with CORBA communication capabilities. In order to understand the generation process for the SNMP agent code 126, a developer should be aware of certain interdependencies between the SAF 62 and the MOF 54 (FIG. 7).

The basic SNMP protocol handling and MIB hooking capabilities in the SNMP agent code 126 are provided by Emissary 128 from Wind River's SNMP agent toolkit. Interdependencies between the RAC framework 24 and Emissary 126 are provided through extensions to Emissary 126 associated with the SAF code generator 53. The SAF code generator 53 is operated through command line options 44 and the extensions are introduced through the extension option -moftable.

As in any SNMP development, the entry point for developing the SNMP agent code 126 is defining the MIB. Emissary 128 is used as the SNMP engine. Hence, hence keywords associated with Emissary 128 (e.g., FORCE INCLUDE, DEFAULT etc.) should be defined. For the meaning and use of Emissary keywords, refer to the Emissary user's guide.

The NMF definition file(s) 39 (e.g., nmf.cfg) act as an input for generating the data server access classes 130 required to access the managed objects and their attributes corresponding to each table. Before writing the NMP definition file(s) 39, a developer should have information about the managed objects. The NMF definition file(s) 39 supply information to the SAF code generator 53 through the SNMP agent framework parser 43. The information includes mapping information between MIB tables and managed object classes with distinguished names. For example, an nmf.cfg (i.e., NMF definition file 39) may include the following information:
TableName1 <DistinguishedName> <managedobjectclass>
TableName2 <DistinguishedName> <managedobjectclass>
TableName3 <DistinguishedName> <managedobjectclass>

The -moftable command line option causes the SAF code generator 53 to generate a table name MOF class for each table name mentioned in the nmf.cfg. The table name MOF classes are inherited from the SNMP table MOF class 74 (FIG. 10) which provides table instrumentation functionality. Two keywords that can be defined, if necessary, are APPLICATION and NO_PREFIX_STRIP. The APPLICATION keyword is the module name and is used in prefixing the attrDefns statements generated from of the -moftable command line options. This keyword is also used as prefix to "include files" (e.g., <APPLICATION>Oid.h and <APPLICATION>Leaf.h). Thus, files generated by Emissary 128 from -skel and -leaf command line options have the same names. Traditionally, MIB variables are defined with a corresponding module name prefix and in many cases it is desirable to remove the prefixes. By default, the SAF code generator 53 removes the leading common characters (i.e., prefixes) in a particular module. When the NO_PREFIX_STRIP keyword is defined in the NMF definition file(s) 39, the SAF code generator 53 is instructed not to strip the leading common characters from the MIB variables.

The following provides exemplary application class definitions, for example, for configuration data and agent instantiation. Initially, a user class inheriting from the SNMP V3 agent class 90 (FIG. 9) is defined. Typically, user classes do not have to override the member functions from the SNMP V3 agent class. However, if the server network management applications 28 (FIG. 1) need persistency, the corresponding user classes need to provide implementations for read-FromDb( ) and writeTodB( ) methods. Member variables corresponding to each table defined in the nmf.cfg are defined. The constructors typically instantiate each class and assign the references to the variables. It is advisable to provide a method to access and delete the global SNMP agent pointer (e.g., instance( ) and deleteAgent( )). An example of code defining such a user class is provided below:

```
ApplicationAgent:public SnmpV3Agent {
//constructor
//destructor
static ApplicationAgent* instance( );
    deleteAgent( );
        readFromDb(int& userCounter);
            WriteToDb(int& userCounter);
            TableName1Mof var1;
        TableName2Mof var2;
            .
            .
            .
        TableName3Mof var3;
                        }
Note : At this stage you have not yet generated
TableNameMof classes with you.
```

Next, the user security model (USM) is configured by extending the SNMP user class 92 (pure virtual) and providing the necessary configuration details. An example of code configuring the USM is provided below:

```
    class ApplicationUser: public SnmpUser
{
public:
    ApplicationUser( std::string uname, SnmpEngineId& );
    ~ApplicationUser( void );
    int getUserName(std::string&);
    int getPrivProt(SnmpUser::privProt&);
    int getAuthProt(SnmpUser::authProt&);
    int getAuthKey(std::string&);
    int getPrivKey(std::string&);
    int getUserStatus(SnmpUser::userStatus&);
    int getStorageStatus(SnmpUser::storageStatus&);
    int getUserEngineId(SnmpEngineId&);
    SnmpEngineId pId;
    std::string uName;
};
```

Next, traps and notifications associated with SNMP, version 3 are set up. The SAF 62 provides three classes for configuring target and notify MIBs (i.e., SNMP V3 target class 96 (FIG. 9), SNMP V3 target parameter class 98 (FIG. 9), and SNMP V3 notify class 100 (FIG. 9)). These classes provide implementations for the virtual functions. An example code extending the SNMP V3 target class 96 (FIG. 9), SNMP V3 target parameter class 98 (FIG. 9), and SNMP V3 notify class 100 (FIG. 9) is provided below:

```
    class ApplicationTarget: public SnmpV3Target
{
public :
    ApplicationTarget( );
    ~ApplicationTarget( );
```

```
-continued int getTargetName(std::string&);
    int getIpAddress(std::string&);
    int getPortNumber(int&);
    int getAddrParam(std::string&);
    int getTagList(std::string&);
    int getDomain(std::string&);
    int getRetryCount(int&);
    int getTimeout(int&);
    int getStatus(entityStatus&);
    int getStorageType(storageStatus&);
};
#include <saf/SnmpV3TargetParam.h>
class ApplicationTargetParam : public SnmpV3TargetParam
{
public:
    ApplicationTargetParam( );
    ~ApplicationTargetParam( );
    int getParamName(std::string&);
    int getSecName(std::string&);
    int getMsgProcModel(mpModel&);
    int getSecLevel(secLevel&);
    int getStatus(entityStatus&);
    int getStorageType(storageStatus&);
};
#endif
#include <saf/SnmpV3Notify.h>
/*
 * User class to implement the SnmpV3Notify.
 */
class ApplicationNotify: public SnmpV3Notify
{
public :
    ApplicationNotify( );
    ~ApplicationNotify( );
```

Next, the SAF code generator 53 is operated to generate classes and function definitions. The commands and command line options provided below are an exemplary sequence of commands to operate the SAF code generator 53. The output file can be given any name. Accordingly, the developer may have to change the file names of include files in some of the generated files.

SafGen -mib.c - o Mib.c *.mib
SafGen -leaf - o Leaf.h *.mib
SafGen -oid -o OIDs.c *.mib
SafGen -oid.h -o OIDs.h *.mib
SafGen -skel.h -o AgentDefs.h *.mib
SafGen -skel -o AgentInstr.C *.mib
SafGen -trap.h -o Trap.h *.mib
SafGen -trap.c -o Trap.c *.mib
SafGen -notify.h -o Notify.h *.mib
SafGen -notify.c -o Notify.c *.mib
SafGen -moftable $(>)

Emissary 128 generates the MIB access functions 132 based in conjunction with the -skel, -skel.h, -mib, -oid, -trap, and -Leaf command line options. The SAF code generator 53 generates the data server access classes 130 (i.e., the backend) in conjunction with the -moftable command line option. The files generated from the -skel and -mofTable command line options may be customized.

The -skel command line option generates a user hook (e.g., get, set, next, and test) skeleton for the MIB variables. This is where the user provides links to the actual information associated with, for example, the data servers 32 (FIG. 19). When an SNMP query is received by the to SNMP engine for any particular MIB variable, the corresponding user hook gets called. For many of the MIB variables, the Emissary 128 has the information, in which case the developer calls the corresponding getproc_nosuchins (pktp, vbp), setproc_no_next (pktp, vbp), etc. For a comprehensive understanding of these MIB access functions and their significance refer the Emissary user's manual and other associated documentation. For the user hooks corresponding to tables defined in nmfcfg, the developer calls the getTableEntry defined in the corresponding SNMP table MOF variable. For example, for an entry TableName1 table, call TableName1Mof->getTableEntry (...). Since the MIB access functions 132 are C functions and compiled with C++ classes, the functions are wrapped in extern C { } declaration and submitted to the build process 25.

As mentioned above, the -mofTable command line option generates a subclass of the SNMP table MOF class 74 (FIG. 10) for each table given in the NMF definition file(s) 39 (e.g., nmf.cfg). Minor adjustments in include file names may be required for the build process 25 to compile this properly. This file includes the OIDs.h files generated from the -oid.h option. The include file names are <APPLICATION>OIDs.h, where APPLICATION is the name of the module defined in nmf.cfg. This name is also the name of the module in the corresponding MODL file 36 (FIG. 3). If there is any mismatch in the file names generated and the file names included, an adjustment by the developer is required.

At this stage, the developer has all the components to implement the SNMP agent 112 (FIG. 19) and the main function (or loop) 136 may be developed. The main function 136 typically initializes CORBA-related functionality and establishes an infinite loop waiting for SNMP queries. Further specifics of the main function 136 depend on the architecture of the network design 12 (FIG. 1). The following list provides guidelines of the most common steps to writing the main function 136: 1) initialize CORBA functionality by instantiating a service proxy factory depending on the CORBA implementation (e.g., ORBIX or E-ORB), 2) instantiate a NameServer and register with the name server, 3) register the related and required attribute factory and attribute factory finder, 4) find the attribute server which is the entry point for the SNMP agent to obtain information on managed objects, 5) call the ApplicationAgent::setAttributeServer function to set the attribute server, 6) instantiate the user agent, 7) instantiate an SNMP event handler class by passing ApplicationAgent::instance( ) as the argument, 8) in an infinite loop, call the SnmpEventHandler::processSnmp Mesage( ), 9) add users (i.e., subclasses of the SNMP user class 92 (FIG. 9) to the SNMP V3 agent by calling the addUser method in the SNMP V3 agent, and 10) add targets, target parameters, and notify instances by calling addV3Target( ), addV3TargetParam( ) and addV3Notify( ).

Note that the steps above should be taken as guidelines rather than diktats. The first three steps above are common to most network designs 12 (FIG. 1). For sending the actual notifications, developers can either use the generated code (i.e., -notify.c) option or the SNMP_Send_ Notify_Name( ) option provided with Emissary 128.

The build process 25 compiles and links the generated files along with libraries associated with Emissary 128, SAF 62, and other RAC frameworks 24. Typically, the SNMP agent framework server 140 needs to be linked with mib.o, oid.o, AgentInstr.o, TableNameMofo, and other application class objects.

The following paragraphs describe an exemplary process for building an SNMP agent. An SNMP agent 112 (FIG. 19) can be set up as a proxy server for a data server or as an agent whose resources are stored in the MOF. In both cases, the MIB, as defined in terms of SNMP SMI, plays an important role. The exemplary process being described explains building the SNMP agent as a proxy server. The proxy server provides an SNMP front end to MOF objects. The objects co-relate to the simple MODL objects defined above. The general steps includes: 1) defining the MIB corresponding to the objects, 2) defining the nmf.cfg file to specify mapping from SNMP MIB to ODL associated with the RAC framework, 3) running the MIB through the SAF code generator 53 (FIG. 20) to generate the SNMP agent code 126, and 4) instantiating the SNMP agent and providing the link to AttributeServerInterface and nameserver.

An example of code that defines the MIB, as described above in step 1), is provided below:

```
SIMPLE-MIB
      --FORCE-INCLUDE <simpleAgentDefs.h>
DEFINITIONS::= BEGIN
IMPORTS
      Counter, Gauge
            FROM RFC1155-SMI
            MODULE-IDENTITY, OBJECT-TYPE, enterprises,
IpAddress, Integer32,
      Unsigned32, TimeTicks, Counter32, Gauge32, Counter64
            FROM SNMPv2-SMI
            DisplayString, RowStatus, TEXTUAL-CONVENTION,
DateAndTime
            FROM SNMPv2-TC;
lucent                OBJECT IDENTIFIER ::= { enterprises 1751
}
rubyMibs OBJECT IDENTIFIER ::= { lucent 2 22 }
rac                   OBJECT IDENTIFIER ::= { rubyMibs 1 }
racExamples     OBJECT IDENTIFIER ::= { rac 999 }
simpleMib MODULE-IDENTITY
      LAST-UPDATED "9806021800Z"
      ORGANIZATION "Lucent Wireless Division"
      CONTACT-INFO
             "      RAC TEAM"
      DESCRIPTION
            "This is a simpleAs MIB to demonstrate the
MIB
            instrumrntation using Managed Object Framework
            and SNMP Agent."
      ::= { racExamples 1 }
--
*************************************************************
-- Textual Conventions
--
*************************************************************
--
*************************************************************
-- Simple Attribute Server Test Table
--
*************************************************************
simpleAsTable OBJECT-TYPE
      SYNTAX SEQUENCE OF SimpleAsEntry
      MAX-ACCESS not-accessible
      STATUS current
      DESCRIPTION
            "Just a simpleAs table."
      ::= { simpleMib 1 }
simpleAsEntry OBJECT-TYPE
      SYNTAX SimpleAsEntry
      MAX-ACCESS not-accessible
      STATUS current
      DESCRIPTION
            "This table is indexed by simpleAsId."
      INDEX { simpleAsId }
      ::= { simpleAsTable 1 }
SimpleAsEntry ::= SEQUENCE {
      simpleAsId       INTEGER,
      simpleText       DisplayString,
      simpleValue      Integer
      }
      simpleAsId OBJECT-TYPE
      SYNTAX INTEGER
      MAX-ACCESS read-write
      STATUS current
      DESCRIPTION
            "The index into the table."
      ::= { simpleAsEntry 1 }
```

-continued

```
simpleValue OBJECT-TYPE
    SYNTAX Integer32(-256 . . . 256)
    MAX-ACCESS read-write
    STATUS current
    DESCRIPTION
        "An integer attribute."
    DEFVAL { -128 }
    ::= { simpleAsEntry 4 }
simpleAsDisplayStrAttr OBJECT-TYPE
    SYNTAX DisplayString
    MAX-ACCESS read-write
    STATUS current
    DESCRIPTION
        "A display string attribute."
    ::= { simpleAsEntry 11 }
END
```

As shown in the exemplary code above, there need not be any one-to-one mapping in the names of MIB variables.

The code below provides an exemplary configuration file (i.e., nmf.cfg) associated with step 2) above with the module name (i.e., application tag) followed by the SNMP table name-to-managed object name mapping:

```
APPLICATION simple

# Table to MO mapping

simpleAsTable TH.Simple
```

The commands and command line options 44 (FIG. 20) provided below show an exemplary sequence for generating the SNMP agent code 126 (FIG. 20) using the SAF code generator 53 (FIG. 20) in conjunction with step 3) above:

```
SafGen -mib.c - o Mib.c *.mib
SafGen -leaf - o Leaf.h *.mib
SafGen -oid -o OIDs.c *.mib
SafGen -oid.h -o OIDs.h *.mib
SafGen -skel.h -o AgentDefs.h *.mib
SafGen -skel -o AgentInstr.C *.mib
SafGen -trap.h -o Trap.h *.mib
SafGen -trap.c -o Trap.c *.mib
SafGen -moftable $(>)
```

Except for the -moftable command line option, the command line options shown above are associated with Emissary and generate code associated with the SNMP engine 114 (FIG. 19). The -moftable command line option generates a class that provides mapping from index to variable. This class is referred to as simpleAsTableMof.

Instantiating and linking the SNMP agent, as discussed above in step 4), includes writing a user class. The user class is defined to inherit from the SNMP agent class 88 (FIG. 9). Typically, the user class need not override the member functions from the SNMP agent. Next, member variables are defined corresponding to each table defined in the nmf.cfg file. The constructors typically instantiate each class and assign the references to the variables. It is advisable to provide a method to access and delete the global SNMP agent pointer. (e.g., instances( ) and deleteAgent( )). An example of code to define the user class is provided below:

```
UserAgent.h
    : UserAgent:public SnmpAgent {
        //constructor
        //destructor
        static UserAgent* instance( );
        deleteAgent( );
        simpleTableMof simpleTable_;
}
```

-continued

```
UserAgent.C file
UserAgent::UserAgent( void )
{
    simpleTable_ = new simpleTableMof;
}
UserAgent :: ~UserAgent( )
{
    delete simpleTable_;
}
UserAgent*
UserAgent::instance( void )
{
    if( SnmpAgent::globalAgentPtr_ == NULL )
        SnmpAgent::globalAgentPtr_ = new BscAgent;
    return RUBY_DYNAMIC_CAST(UserAgent*,
SnmpAgent::globalAgentPtr_);
}
int
UserAgent::deleteAgent( void )
{
    delete SnmpAgent::globalAgentPtr_;
    return 0;
}
int
UserAgent::setIPAddress( void )
{
    // Receive packets from all interfaces
    this->snmp_local_ip_address.setIpAddress(
htonl(INADDR_ANY) );
        return 0;
}
```

At this stage, the developer has all the components to implement the SNMP agent 112 (FIG. 19) and the main function (or loop) 136 (FIG. 20) may be developed. An example of code for the main function 136 (FIG. 20) is provided below:

```
SnmpObjectStream *snmpStream; //used for streaming MIB
variables into MOF
RUBY_DEF_TIE(AgentMAP,SnmpAgent)
void* procSnmpMessage( void *vp);
SnmpAgent* agentPtr ;
int SNMP_DEFAULT_PORT = 8000;//will be overridden with
environment variable if environment variable SNMP_PORT
is set.
main(int argc, char** argv)
{
//Initialise corba.
    RUBY_TRY {
        CORBA::ORB* orb = RubyCorbaHelper::initOrb(argc,
argv);
    }
    RUBY_CATCHANY {
        cerr << "UnKnown Exception occurred in initOrb" <<
endl;
#include "util/FLXiostream.h"
#include <ace/CORBA_Handler.h>
//#include "da/ServiceProxyFactory.h"
#include <da/ProxyFinder.h>
#include "mof/ManagedObjectNameServer.h"
#include "saf/SnmpEventHandler.h"
#include "BscAgent.h"
#include "common/RubyCorbaHelper.h"
#include "RacAttrDefns.h"
#if defined RUBY_HAS_EORB
#include "mof/CorbaAttributeServerInterface.h"
#include "mof/EorbServerMap.h"
//ServiceProxyFactory< CorbaAttributeServerInterface,
AttributeServerInterface > mosSrvrInt ( "AgentServer", (
void*)"AgentServer", "AgentServer", 0);
#endif
RUBY_DEF_TIE(AgentMAP,SnmpAgent)
void* procSnmpMessage( void *vp);
```

```
-continued

SnmpAgent* agentPtr ;
int SNMP_DEFAULT_PORT = 8000;//will be overridden with
environment variable if environment varaible SNMP_PORT
is set.
main(int argc, char** argv)
{
  RUBY_TRY {
    CORBA::ORB* orb = RubyCorbaHelper::initOrb(argc,
argv);
  }
  RUBY_CATCHANY {
    cerr << "UnKnown Exception occurred in initOrb" <<
endl;
    exit(-1);
  }
  RUBY_ENDTRY
#if defined RUBY_HAS_EORB
  ServerMap::instance( new EorbServerMap( ) );
#endif
  //--------[ Initialize attribute factory, name server,
SNMP stream ]------
  NameServerInterface* nameServer = new
ManagedObjectNameServer;
  NameServerInterface::instance( nameServer );
  AttributeServerInterface* asi =
ProxyFinder<AttributeServerInterface>::GetProxy(
"AgentServer", "AgentServer",
0 );
  assert( asi != 0 );
  SnmpAgent::setAttributeServer( asi );
//Provide an id to saf server.
  snmpStream = new SnmpObjectStream;
  //--------[ Register MO with name server ]-------------
  ServerId serverNameId;
  serverNameId.classId = "SafServer";
  serverNameId.instanceId = 0;
  ServerId::thisServerId( serverNameId );
// registerMosWithNameServer( );
  ServerId dsId;
  dsId.classId = "DataServer";
  dsId.instanceId = 0;
  nameServer->registerManagedObjectClass(
RacAttrDefns::Alarm::getFullClassName( ),dsId);
  nameServer->registerManagedObjectClass(
RacAttrDefns::AlarmCount::getFullClassName( ),dsId);
  //Register attribute factories.
  RacAttrDefns::registerAttributeFactories( );
  //-------[ Instantiate and run agent server ]----------
  int portNumber = SNMP_DEFAULT_PORT;
  char *snmpPort;
        if ( (snmpPort = (char *)getenv("SNMP_PORT")) !=
(char *)NULL ) {
            portNumber = atoi(snmpPort);
        }
  agentPtr = BscAgent::instance( );
  ACE_thread_t tid;
  ACE_Thread::spawn( processSnmpMessage, NULL,
THR_NEW_LWP, &tid );
  RUBY_TRY {
 AgentMAP_var agentVar = RUBY_CORBA_NEW
RUBY_TIE_DEF(AgentMAP, SnmpAgent) ( agentPtr);
    if (agentPtr->bindPort(portNumber) < 0)
    {
      cerr << "BscAgent failed to bind to port " <<
portNumber << endl;
      exit(-1);
    }
    cout << "BscAgent is available at port " <<
portNumber << endl;
#if defined RUBY_HAS_ORBIX
    CORBA::Orbix.setDiagnostics(2,IT_X);
#endif
    RubyCorbaHelper::implIsReady("BscAgent", 0 );
    }
RUBY_CATCH (CORBA::SystemException, sysEx)
    {
      cerr << "System Exception occurred " << &sysEx <<
```

```
-continued endl;
      exit(-1);
    }
RUBY_CATCHANY
    {
      cerr << "UnKnown Exception occurred " << endl;
      exit(-1);
    }
RUBY_ENDTRY
  SnmpEventHandler snmpHandle( agentPtr );
#if 0
  ACE_CORBA_Handler* snmpReactor =
ACE_MT_CORBA_Handler::instance( );
  if( snmpReactor->reactor( )-
>register_handler(&snmpHandle,
ACE_Event_Handler::READ_MASK) == -1) {
    cerr << "SnmpEventHandler registration with
ACE_Reactor failed." << endl;
      exit(-1);
  }
  cout << "SnmpEventHandler registration with
ACE_Reactor succeeded." << endl;
#endif
}
//Wait in infinite loop for SNMP requests.
void* procesSnmpMessage( void *vp )
{
  SnmpEventHandler snmpHandler( agentPtr );
  ACE_HANDLE handler = snmpHandler.get_handler( );
  cout<<"Waiting for SNMP requests"<<endl;
      while(1){
          snmpHandler.handle_input(handler);
      }
  return 0;
}
```

The above description merely provides a disclosure of particular embodiments of the invention and is not intended for the purposes of limiting the same thereto. As such, the invention is not limited to only the above-described embodiments. Rather, it is recognized that one skilled in the art could conceive alternate embodiments that fall within the scope of the invention.

We claim:

1. A method of developing one or more application programs that cooperate to manage a distributed system comprising one or more servers, wherein at least one application program is associated with each server, the method including the steps:

a) defining one or more managed objects associated with the distributed system in an object-oriented resource definition language and storing the definition of the one or more managed objects in one or more resource definition language files, wherein the definition of the one or more managed objects is based on an existing design and hierarchical structure of the distributed system, wherein parent-child relationships between the one or more managed objects are identified in the one or more resource definition language files using the object-oriented resource definition language to define the one or more managed objects in relation to the hierarchical structure of the distributed system;

b) parsing the one or more resource definition language files to ensure conformity with the object-oriented resource definition language and creating an intermediate representation of the distributed system from the one or more conforming resource definition language files;

c) processing the intermediate representation of the distributed system to form one or more programming language classes, one or more database definition files, and one or more script files;

d) providing a reusable asset center framework to facilitate development of the one or more application programs, the reusable asset center including an SNMP agent framework that provides SNMP interface functionality to at least one of the one or more application programs, wherein the SNMP agent framework includes an SNMP table management object framework class that converts SNMP requests to managed object framework commands and an SNMP table class that includes procedures for accessing and chancing data in tables; and e) building the one or more application programs from at least the one or more programming language classes, one or more database definition files, one or more script files, and the reusable asset framework.

2. The method as set forth in claim 1 wherein the distributed system is a network.

3. The method as set forth in claim 2 wherein the network is a telecommunication network.

4. The method as set forth in claim 1, further including the steps:

f) providing one or more data models with information associated with the one or more managed objects;

g) creating one or more network management forum definition files with mapping information between the one or more data models and the one or more managed objects; and h) converting the one or more data models into the object-oriented resource definition language and storing the converted information in the one or more resource definition language files.

5. The method as set forth in claim 1 wherein the SNMP agent framework includes at least one of an SNMP table management object framework class, an agent client interface class, an object identifier converter class, an SNMP object identifier class, an SNMP object stream class, an SNMP object stream finder class, an SNMP engine class, an SNMP agent class, an SNMP V3 agent class, an SNMP user class, an SNMP engine identifier class, an SNMP V3 target class, an SNMP V3 target parameter class, and an SNMP V3 notify class.

6. The method as set forth in claim 1 wherein the SNMP agent framework includes an SNMP table management object framework class, an object identifier converter class, an SNMP object stream class, an SNMP object stream finder class, an SNMP toolkit class, an SNMP table class, a managed object framework agent class, an SNMP table MAS class, and an object stream class.

7. The method as set forth in claim 6 wherein the SNMP table management object framework class includes at least one of a getTableEntry component, a nextTableEntry component, a testTableEntry component, a setTableEntry component, a basicTestTableEntry component, a getAttribute component, a setAttribute component, and a clearRequest component.

8. The method as set forth in claim 6 wherein the object identifier converter class includes at least one of a $MOI2OID component, a $OID2MOI component, a setDNkey component, a getOIDindex component, a registerLeaf_AttrName component, a registerIndexLevel component, a registerConvTable component, and a deregisterConvTable component.

9. The method as set forth in claim 6 wherein the SNMP object stream class includes at least one of a set component, a reset component, a /operator << component, and a /operator >> component.

10. The method as set forth in claim 6 wherein the SNMP object stream finder class includes at least one of an add component, a remove component, a findIstream component, and a findOstream component.

11. The method as set forth in claim 6 wherein the SNMP table class includes at least one of a fetchRow component, a fetchNextRow component, a storeRow component, a getAttribute component, a setAttribute component, a getTableEntry component, a nextTableEntry component, a testAndSetTableEntry component, and a copyOID component.

12. The method as set forth in claim 6 wherein the managed object framework agent class includes at least one of a getAttributes component, a getFirst component, a getNext component, a setAttributes component, a createManagedObject component, and a deleteManagedObject component.

13. The method as set forth in claim 6 wherein the SNMP table MAS class includes at least one of a /getTableEntry component, a /nextTableEntry component, a /setTableEntry component, a /basicTestTableEntry component, and a clearRequest component.

14. The method as set forth in claim 6 wherein the object stream class includes at least one of an operator << component and an operator >> component.

15. The method as set forth in claim 1 wherein the one or more servers include at least one agent server in communication with a network management station and at least one data server in communication with the agent server, wherein the SNMP interface functionality is included in the application program associated with each agent server.

16. The method as set forth in claim 15 wherein the SNMP interface functionality in the application program associated with at least one agent server provides a communication interface to the network management station.

17. The method as set forth in claim 15 wherein the SNMP interface functionality in the application program associated with at least one agent server provides a communication interface to one or more data servers.

18. A method of developing one or more application programs in operative communication to manage a network including one or more servers, wherein at least one application program is associated with each server, the method including the steps:

a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network;

b) providing one or more data models with information associated with the one or more managed objects;

c) creating one or more network management forum definition files with mapping information between the one or more data models and the one or more managed objects;

d) converting the one or more data models into the object-oriented resource definition language and storing the converted information in the one or more resource definition language files;

e) parsing the one or more resource definition language files to ensure conformity with the object-oriented resource definition language and creating an intermediate representation of the network from the one or more conforming resource definition language files, wherein the intermediate representation of the network created in the parsing step includes a parse tree;

f) processing the parse tree to form one or more programming language classes, wherein the one or more programming language classes formed include at least one of one or more system classes, one or more module classes, one or more managed object classes, and one or more composite attribute classes;

g) providing a reusable asset center framework to facilitate development of the one or more application programs, the reusable asset center including an SNMP agent framework that provides SNMP interface functionality to at least one of the one or more application programs wherein the SNMP agent framework includes an SNMP table management object framework class that converts SNMP requests to managed object framework commands and an SNMP table class that includes procedures for accessing and changing data in tables; and h) building the one or more application programs from at least the one or more programming language classes and the reusable asset framework.

19. The method as set forth in claim 18 wherein the one or more servers include at least one agent server in communication with a network management station and at least one data server in communication with the agent server, wherein the SNMP interface functionality is included in the application program associated with each agent server.

20. The method as set forth in claim 19 wherein the SNMP interface functionality in the application program associated with at least one agent server provides a communication interface to the network management station.

21. The method as set forth in claim 19 wherein the SNMP interface functionality in the application program associated with at least one agent server provides a communication interface to one or more data servers.

22. The method as set forth in claim 18 wherein the data models are management information base tables.

23. The method as set forth in claim 18 wherein the resource definition language is managed object definition language.

24. The method as set forth in claim 18 wherein the parsing step includes operation of an SNMP agent framework parser to ensure compatibility of the one or more resource definition language files with the SNMP agent framework.

25. The method as set forth in claim 18 wherein the processing step includes operation of an SNMP agent framework code generator to form one or more programming language classes associated with the SNMP interface functionality.

26. The method as set forth in claim 25, further including the step:

i) initiating the SNMP agent framework code generator in the processing step with an initiating command with one or more command line options for customizing operation of the SNMP interface functionality, wherein processing by the SNMP agent framework code generator is subsequently performed in accordance with the one or more command line options in the initiating command.

27. The method as set forth in claim 26 wherein the initiating command includes at least one of a first command line option that specifies generation of one or more SNMP table MOF class definition and implementation files and a second command line option that specifies inclusion of the SNMP interface functionality in one or more of the application programs.

28. The method as set forth in claim 18 wherein the network management forum definition files include at least one of an "application" keyword representing a module name and a "no_prefix_strip" keyword that is a flag specifying whether or not to strip leading common characters associated with management information base variables.

29. A method of developing an application program to manage a network, the method including the steps:

a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network;

b) providing one or more data models with information associated with the one or more managed objects;

c) creating one or more network management forum definition files with mapping information between the one or more data models and the one or more managed objects;

d) converting the one or more data models into the object-oriented resource definition language and storing the converted information in the one or more resource definition language files;

e) parsing the one or more resource definition language files to ensure conformity with the object-oriented resource definition language and creating an intermediate representation of the network from the one or more conforming resource definition language files, wherein the intermediate representation of the network includes object meta-data;

f) processing the object meta-data to form one or more programming language classes, one or more database definition files, and one or more script files, wherein the one or more programming language classes formed include at least one of an index class and a query class;

g) providing a reusable asset center framework to facilitate development of the application program, the reusable asset center including an SNMP agent framework that provides SNMP interface functionality to at least one of the one or more application programs wherein the SNMP agent framework includes an SNMP table management object framework class that converts SNMP requests to managed object framework commands and an SNMP table class that includes procedures for accessing and changing data in tables; and h) building the application program from at least the one or more programming language classes, one or more database definition files, one or more script files, and the reusable asset framework.

30. The method as set forth in claim 29 wherein the data models are management information base tables.

31. The method as set forth in claim 29 wherein the resource definition language is managed object definition language.

32. The method as set forth in claim 29 wherein the parsing step includes operation of an SNMP agent framework parser to ensure compatibility of the one or more resource definition language files with the SNMP agent framework.

33. The method as set forth in claim 29 wherein the processing step includes operation of an SNMP agent framework code generator to form one or more programming language classes associated with the SNMP interface functionality.

34. The method as set forth in claim 33, further including the step:
   i) initiating the SNMP agent framework code generator in the processing step with an initiating command with one or more command line options for customizing operation of the SNMP interface functionality, wherein processing by the SNMP agent framework code generator is subsequently performed in accordance with the one or more command line options in the initiating command.

35. The method as set forth in claim 29 wherein the network management forum definition files include at least one of an "application" keyword representing a module name and a "no_prefix_strip" keyword that is a flag specifying whether or not to strip leading common characters associated with management information base variables.

36. The method as set forth in claim 29 wherein the SNMP agent framework includes at least one of an SNMP table management object framework class, an agent client interface class, an object identifier converter class, an SNMP object identifier class, an SNMP object stream class, an SNMP object stream finder class, an SNMP engine class, an SNMP agent class, an SNMP V3 agent class, an SNMP user class, an SNMP engine identifier class, an SNMP V3 target class, an SNMP V3 target parameter class, and an SNMP V3 notify class.

37. The method as set forth in claim 29 wherein the SNMP agent framework includes an SNMP table management object framework class, an object identifier converter class, an SNMP object stream class, an SNMP object stream finder class, an SNMP toolkit class, an SNMP table class, a managed object framework agent class, an SNMP table MAS class, and an object stream class.

38. The method as set forth in claim 1 wherein the SNMP agent framework includes an object identifier converter class that translates SNMP object identifiers to managed object framework representations and translates managed object framework representations to SNMP object identifiers.

39. A method of developing one or more application programs that cooperate to manage a distributed system comprising one or more servers, wherein at least one application program is associated with each server, the method including the steps:
   a) defining one or more managed objects associated with the distributed system in an object-oriented resource definition language and storing the definition of the one or more managed objects in one or more resource definition language files, wherein the definition of the one or more managed objects is based on an existing design and hierarchical structure of the distributed system, wherein parent-child relationships between the one or more managed objects are identified in the one or more resource definition language files using the object-oriented resource definition language to define the one or more managed objects in relation to the hierarchical structure of the distributed system;
   b) parsing the one or more resource definition language files to ensure conformity with the object-oriented resource definition language and creating an intermediate representation of the distributed system from the one or more conforming resource definition language files;
   c) processing the intermediate representation of the distributed system to form one or more programming language classes, one or more database definition files, and one or more script files;
   d) providing a reusable asset center framework to facilitate development of the one or more application programs, the reusable asset center including an SNMP agent framework that provides SNMP interface functionality to at least one of the one or more application programs, wherein the SNMP agent framework includes an SNMP object stream class that specializes an abstract base class object stream to externalize and internalize SNMP packets to a data stream compatible with network application programs; and
   e) building the one or more application programs from at least the one or more programming language classes, one or more database definition files, one or more script files, and the reusable asset framework.

40. A method of developing one or more application programs in operative communication to manage a network including one or more servers, wherein at least one application program is associated with each server, the method including the steps:
   a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network;
   b) providing one or more data models with information associated with the one or more managed objects;
   c) creating one or more network management forum definition files with mapping information between the one or more data models and the one or more managed objects;
   d) converting the one or more data models into the object-oriented resource definition language and storing the converted information in the one or more resource definition language files;
   e) parsing the one or more resource definition language files to ensure conformity with the object-oriented resource definition language and creating an intermediate representation of the network from the one or more conforming resource definition language files, wherein the intermediate representation of the network created in the parsing step includes a parse tree;
   f) processing the parse tree to form one or more programming language classes, wherein the one or more programming language classes formed include at least one of one or more system classes, one or more module classes, one or more managed object classes, and one or more composite attribute classes;
   g) providing a reusable asset center framework to facilitate development of the one or more application programs, the reusable asset center including an SNMP agent framework that provides SNMP interface functionality to at least one of the one or more application programs wherein the SNMP agent framework includes an SNMP object stream class that specializes an abstract base class object stream to externalize and internalize SNMP packets to a data stream compatible with network application programs; and h) building the one or more application programs from at least the one or more programming language classes and the reusable asset framework.

41. A method of developing an application program to manage a network, the method including the steps:

a) defining one or more managed objects associated with the network in an object-oriented resource definition language and storing the definition of the one or more managed objects in one or more resource definition language files, wherein the definition of the one or more managed objects is based on an existing design and hierarchical structure of the network, wherein parent-child relationships between the one or more managed objects are identified in the one or more resource definition language files using the object-oriented resource definition language to define the one or more managed objects in relation to the hierarchical structure of the network;

b) providing one or more data models with information associated with the one or more managed objects;

c) creating one or more network management forum definition files with mapping information between the one or more data models and the one or more managed objects;

d) converting the one or more data models into the object-oriented resource definition language and storing the converted information in the one or more resource definition language files;

e) parsing the one or more resource definition language files to ensure conformity with the object-oriented resource definition language and creating an intermediate representation of the network from the one or more conforming resource definition language files, wherein the intermediate representation of the network includes object meta-data;

f) processing the object meta-data to form one or more programming language classes, one or more database definition files, and one or more script files, wherein the one or more programming language classes formed include at least one of an index class and a query class;

g) providing a reusable asset center framework to facilitate development of the application program, the reusable asset center including an SNMP agent framework that provides SNMP interface functionality to at least one of the one or more application programs wherein the SNMP agent framework includes an SNMP object stream class that specializes an abstract base class object stream to externalize and internalize SNMP packets to a data stream compatible with network application programs; and h) building the application program from at least the one or more programming language classes, one or more database definition files, one or more script files, and the reusable asset framework.

\* \* \* \* \*